United States Patent [19]

Krutak, Sr. et al.

[11] 3,932,380

[45] Jan. 13, 1976

[54] MAGENTA IMAGE-PROVIDING PHENYLAZO-NAPHTHYL DYES

[75] Inventors: James J. Krutak, Sr., Kingsport, Tenn.; Jan R. Haase; Richard A. Landholm, both of Rochester, N.Y.

[73] Assignee: Eastman Kodak Company, Rochester, N.Y.

[22] Filed: Feb. 5, 1974

[21] Appl. No.: 439,787

[52] U.S. Cl. ........................ 260/197; 96/1.2; 96/1.3; 96/1.6; 96/3; 96/29 R; 96/55; 96/66; 260/152; 260/156; 260/198; 260/199; 260/200; 260/201; 260/202; 260/456 A; 260/543 R; 260/556 A; 260/556 B; 260/556 C; 260/559 S

[51] Int. Cl.² .................. C09B 29/10; C09B 29/20; G03C 5/30; G03C 5/54

[58] Field of Search ........... 260/197, 198, 199, 200, 260/201, 202; 96/3

[56] References Cited

UNITED STATES PATENTS

| | | | |
|---|---|---|---|
| 2,706,684 | 4/1955 | Graham et al. | 260/202 X |
| 3,148,062 | 9/1964 | Whitmore et al. | 96/55 |
| 3,443,939 | 5/1969 | Bloom et al. | 96/3 |
| 3,443,940 | 5/1969 | Bloom et al. | 96/3 |
| 3,459,548 | 8/1969 | Bloom et al. | 96/3 |
| 3,498,785 | 3/1970 | Bloom et al. | 96/3 |
| 3,585,028 | 6/1971 | Stephens | 96/3 |
| 3,628,952 | 12/1971 | Puschel et al. | 96/3 |
| 3,709,693 | 1/1973 | Bloom et al. | 96/118 |
| 3,737,316 | 6/1973 | Salminen et al. | 96/56.6 |
| 3,751,406 | 8/1973 | Bloom | 260/162 |

*Primary Examiner*—Floyd D. Higel
*Assistant Examiner*—John J. Doll
*Attorney, Agent, or Firm*—Elliott Stern; Daniel B. Reese, III

[57] ABSTRACT

A magenta image dye-providing compound having a formula as follows:

I.

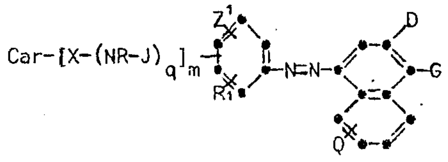

II.

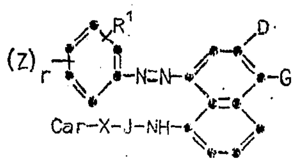

III.

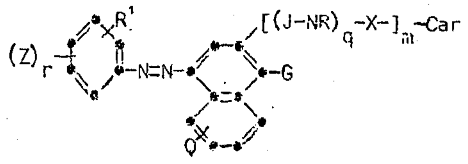

wherein:

Car represents a carrier moiety which, as a function of oxidation under alkaline conditions, releases a diffusible dye from said compound;

*m* and *q* each represent an integer having a value of 0 or 1;

X represents a bivalent linking group;

$Z^1$ represents hydrogen or Z;

$R^1$ represents hydrogen, an alkyl radical an alkoxy radical having 1 to about 4 carbon atoms, or halogen;

D represents cyano, sulfo, fluorosulfonyl, halogen, a $-SO_3-$ phenyl radical, or a phenylsulfonyl radical;

R represents hydrogen or an alkyl radical;

J represents a bivalent radical selected from sulfonyl or carbonyl;

Q is in the 5- or 8-position relative to G and represents hydroxy or an arylamino radical;

G represents hydroxy, a salt thereof, or a hydrolyzable acyloxy group;

*r* represents an integer having a value of 1 or 2;

Z represents cyano, trifluoromethyl, fluorosulfonyl, carboxy, a carboxylic acid ester, nitro in the 2- or 3-position relative to the azo linkage, fluoro, chloro or bromo, an alkylsulfonyl radical, a phenylsulfonyl radical, an alkylsulfonyl radical, a sulfamoyl radical, or a carbamoyl radical;

with the proviso that there be no more than one sulfo radical and no more than one carboxy radical present in said compound.

12 Claims, No Drawings

MAGENTA IMAGE-PROVIDING PHENYLAZO-NAPHTHYL DYES

This invention relates to the art of photography and more particularly, to color diffusion transfer photography employing magenta dye-providing compounds.

Color diffusion transfer processes generally involve the use of a photographic element comprising a support, at least one silver halide emulsion layer and an image dye-providing material which is contained in or contiguous to said layer. The image dye-providing material typically can be thought of as having the structure Car-Col wherein Col is a colorant such as a dye or a dye precursor and Car is an associated carrier or monitoring group which, as a function of alkaline processing, effects a substantial change in the diffusivity of at least the Col portion of the compound.

After exposure, a photographic element as described above is treated with an alkaline processing solution to effect imagewise discrimination in the element. As mentioned previously, the imagewise discrimination is generally brought about by the monitoring or carrier group which, in the presence of the alkaline processing solution, is responsible for a substantial change in the diffusivity of at least the dye portion of the dye-providing material. As is known in the art, the dye-providing material can be initially immobile or initially mobile in the processing solution. Upon alkaline processing of an initially immobile dye-providing material, a mobile dye can be released imagewise or the material can be imagewise rendered soluble and thus mobile. If the material is initially mobile, the processing solution typically renders the material insoluble (and thus immobile) in an imagewise fashion.

It is well known in the art to utilize image dye-providing materials in a photographic element wherein an imagewise exposed element can be contacted with an alkaline processing solution to effect an imagewise difference in mobility of at least a portion of the dye-providing material, i.e., to effect release of a dye or dye precursor, to render said compound insoluble or soluble. It is the particular carrier or monitoring group which determines what form the change in diffusivity (of at least the dye portion of the material) will take. In certain instances, an increase in solubility of a given compound can be accomplished by substantially reducing the molecular weight of the compound; see, for example, the disclosure in Gompf U.S. Pat. No. 3,698,897, issued Oct. 17, 1972, in Fleckenstein et al. U.S. Ser. No. 282,796, filed Aug. 22, 1972, and now abandoned, entitled PHOTOGRAPHIC SYSTEMS, and in Anderson et al. Ser. No. 160,062, filed July 6, 1971, entitled COLOR DIFFUSION TRANSFER PROCESSES, and now U.S. Pat. No. 3,725,062. Exemplary of systems wherein the dye-providing compound splits off a dye are those described in Whitmore U.S. Pat. No. 3,227,552, issued Jan. 4, 1966, and Bloom U.S. Pat. No. 3,443,940, issued May 13, 1969, and Canadian Pat. No. 602,607, issued Aug. 2, 1960. Similarly, Yutzy U.S. Pat. No. 2,756,142, issued July 24, 1956, U.S. Pat. No. 2,774,668, issued Dec. 18, 1956, and U.S. Pat. No. 2,983,606, issued May 9, 1961, describe photographic elements wherein a dye-providing compound is rendered immobile in an imagewise fashion.

All of these prior systems have utility; however, it is desired to provide new compounds which provide dyes having improved properties, such as improved hue, diffusibility, mordantability and the like.

We have found a class of magenta, azo dye-providing compounds well suited for use in color diffusion transfer color elements. The dye-providing compounds, as a function of typical processing under alkaline conditions, provide a magenta-colored substance having a mobility different than that of the compound.

The objects of the present invention are achieved through the use in color diffusion transfer elements of a new class of magenta, azo dye-providing compounds, as well as the dyes provided thereby. Typically, these compounds are utilized in a photosensitive element which comprises a support having thereon at least one photosensitive silver halide emulsion, and at least one of said layers having associated therewith a magenta, azo dye-providing compound of this invention.

The compounds of this invention can be represented by the following formulas:

I.

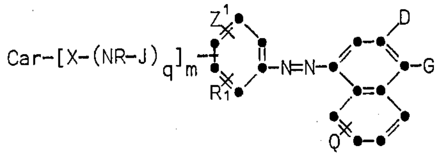

II.

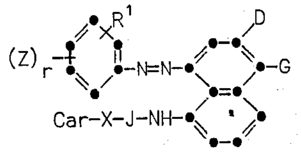

III.

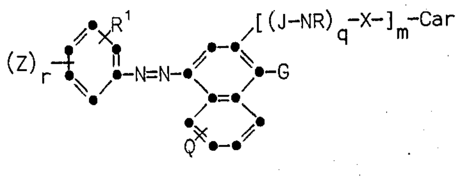

wherein:

Car represents a carrier which is a moiety that, as a function of oxidation under alkaline conditions, provides a substance having a mobility different than that of said compound;

*m* and *q* each represent an integer having a value of 0 or 1;

X represents a bivalent linking group of the formula $-R^2-L_n-R^2_p-$ where each $R^2$ can be the same or different and each represents an alkylene radical having 1 to about 8 carbon atoms; a phenylene radical; or a substituted phenylene radical having 6 to about 9 carbon atoms; L represents a bivalent radical selected from oxy, carbonyl, carboxamido, carbamoyl, sulfonamido, sulfamoyl, sulfinyl or sulfonyl; *n* is an integer having a value of 0 or 1; *p* is 1 and *n* equals 1 and *p* is 1 or 0 when *n* equals 0 or when *q* is 0, Car-X- may represent Car-alkylene-$SO_2$-; Car-$C_6H_4CH_2SO_2$-, or Car-phenylene-$SO_2$-, provided that the carbon content of X does not exceed 14 carbon atoms;

R represents a hydrogen atom, or an alkyl radical having 1 to about 6 carbon atoms;

J represents a bivalent radical selected from sulfonyl or carbonyl;

Q is in the 5- or 8-position relative to G and represents a hydroxy radical or a radical having the formula $-NHCOR^3$ or $-NHSO_2R^3$ wherein $R^3$ is an alkyl radical having 1 to about 6 carbon atoms, a substituted alkyl radical having 1 to about 6 carbon atoms, benzyl, phenyl, or a substituted phenyl radical having 6 to about 9 carbon atoms;

G represents a hydroxy radical, a salt thereof, or a hydrolyzable acyloxy group having the formula:

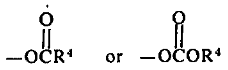

wherein $R^4$ is an alkyl radical having 1 to about 18 carbon atoms, phenyl or substituted phenyl having 6 to about 18 carbon atoms;

*r* represents an integer having a value of 1 or 2;

Z represents a cyano radical, a trifluoromethyl radical, fluorosulfonyl, a carboxy radical, a carboxylic acid ester having the formula $-COOR^4$ wherein $R^4$ is as described previously, a nitro radical in the 2- or 3- position relative to the azo linkage, a fluoro, chloro or bromo atom, an alkyl- or substituted alkylsulfonyl radical having 1 to about 8 carbon atoms, a phenyl- or substituted phenylsulfonyl radical having 6 to about 9 carbon atoms, an alkyl carbonyl having 2 to about 5 carbon atoms, a sulfamoyl radical having the formula $-SO_2NR^5R^6$ wherein $R^5$ represents hydrogen, an alkyl or substituted alkyl radical having 1 to about 8 carbon atoms; $R^6$ represents hydrogen, an alkyl or substituted alkyl radical having 1 to about 6 carbon atoms, a benzyl radical, a phenyl or substituted phenyl radical having 6 to about 9 carbon atoms, alkyl- or substituted alkylcarbonyl having 2 to about 7 carbon atoms, phenyl- or substituted phenylcarbonyl having 7 to about 10 carbon atoms, alkyl- or substituted alkylsulfonyl having 1 to about 6 carbon atoms, phenyl- or substituted phenylsulfonyl having 6 to about 9 carbon atoms; or $R^5$ and $R^6$ taken together with the nitrogen atom to which they are bonded may represent morpholino or piperidino; a carbamoyl radical having the formula $-CON(R^5)_2$ wherein each $R^5$ can be the same or different and is as described previously;

$Z^1$ represents hydrogen or Z;

$R^1$ represents a hydrogen atom, an alkyl radical having 1 to about 4 carbon atoms, a substituted alkyl radical having 1 to about 4 carbon atoms, an alkoxy radical having 1 to about 4 carbon atoms, or a halogen atom;

D represents an electron withdrawing group such as a cyano radical, a sulfo radical, fluorosulfonyl, a halogen atom, a $-SO_3$-phenyl or substituted $-SO_3$-phenyl radical having 6 to about 9 carbon atoms, an alkyl- or substituted alkylsulfonyl radical having 1 to about 8 carbon atoms, a phenyl- or substituted phenylsulfonyl radical having 6 to about 9 carbon atoms, an alkyl- or substituted alkylsulfinyl radical having 1 to about 8 carbon atoms, a phenyl- or substituted phenylsulfinyl radical having 6 to about 9 carbon atoms, a sulfamoyl radical having the formula $-SO_2NR^5R^6$, a carbamoyl radical having the formula $-CON(R^5)_2$ wherein each $R^5$ and $R^6$ is as described previously for Z, with the proviso that there be no more than one sulfo radical and no more than one carboxy radical present in said compound.

As mentioned above, the present compounds contain a carrier moiety (Car-) which, as a function (direct or inverse) of oxidation under alkaline conditions, provides a substance having a mobility different than that of the starting compound. Depending upon the carrier used, the dye-providing compounds of this invention can be of two basic types: (1) initially immobile compounds of which at least a portion is rendered mobile or diffusible as a function of development, or (2) initially mobile or diffusible compounds which are rendered immobile as a function of development. Carriers useful in initially immobile dye-providing compounds such as those wherein the carrier, under alkaline conditions, effects a splitting off of a ballast group from the dye moiety are described further in Whitmore Canadian Pat. No. 602,607, dated Aug. 2, 1960, and Whitmore U.S. Pat. No. 3,227,552, issued Jan. 4, 1966, both incorporated herein by reference. Among the preferred initially immobile compounds are those in which the carrier, as a function of oxidation under alkaline conditions, releases a dye having a mobility different than that of the starting immobile compound. For example, useful carriers for compounds in which the carrier moiety undergoes intramolecular ring closure upon oxidation to split off a dye are described in U.S. Pat. Nos. 3,443,939, 3,443,940 and 3,443,941, all issued May 13, 1969, and all incorporated herein by reference. Special initially immobile carriers useful in forming a diffusible substance as an inverse function of oxidation are described in copending Hinshaw and Condit application Ser. No. 326,628, filed Jan. 26, 1973, and entitled "Positive-Working Immobile Photographic Compounds and Photographic Elements Containing Same", incorporated herein by reference. Improved initially immobile dye-providing compounds which undergo redox reactions followed by alkali cleavage of the carrier to split off a dye are disclosed in Fleckenstein et al. U.S. Ser. No. 282,796, filed Aug. 22, 1972, now abandoned, entitled "Photographic Systems", incorporated herein by reference. The ballasted phenolic and naphtholic carriers of Fleckenstein et al are among preferred carrier moieties. Still other useful carriers are described in U.S. Pat. No. 3,628,952, issued Dec. 21, 1971. Additionally, carriers useful in the formation of initially mobile compounds such as those wherein the carrier functions as a developer are described in Friedman U.S. Pat. No. 2,543,691, issued Feb. 27, 1951; U.S. Pat. No. 2,983,606, issued May 8, 1961; and U.S. Pat. No. 3,255,001, issued June 7, 1966; all incorporated herein by reference. Carriers of this latter type include various hydroquinone moieties.

Examples of bivalent alkylene linking groups representative of $R^2$ are $-CH_2-$, $-C_2H_4-$, $-C_6H_{12}-$, $-C_3H_6-$, $-C_4H_8-$, etc., as well as branched alkylene radicals such as

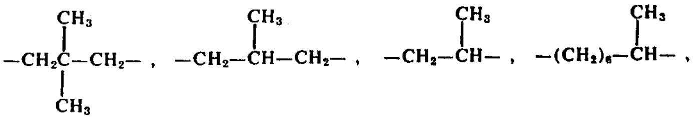

etc.

References hereinafter to "*o*", "*m*" and "*p*" mean that either the ortho, meta or para radicals are indicated, as the case may be.

Examples of phenylene and substituted phenylene radicals representative of $R^2$ are o,m,p-phenylene, o,m,p-phenylene substituted with chloro, methoxy, butoxy, bromo, cyano, nitro, methyl, ethyl, carboxy, sulfo, amino, etc.

As used herein the oxygen- or sulfur-containing bivalent radicals representative of L are oxy (—O—), carbonyl (—CO—), carboxamido (—CONH—), carbamoyl (—NHCO—) sulfonamido (—$SO_2$NH—), sulfamoyl (—$NHSO_2$—), sulfinyl (—SO—) and sulfonyl (—$SO_2$—). Therefore, non-limiting examples of bivalent linking groups which may be represented by X are $-CH_2-O-CH_2-$,

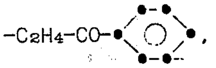,

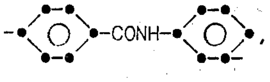, $-C_3H_6-NHCO-C_4H_8-$,

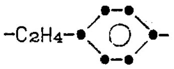, 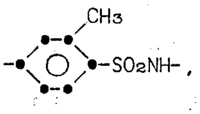, 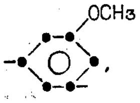,

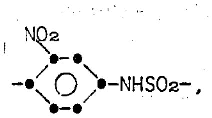, $-C_2H_4-SO-C_3H_6-$, $-C_2H_4-SO_2-C_6H_{12}-$,

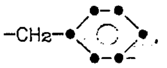, 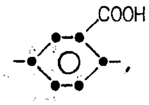,

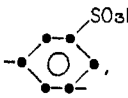, etc.

Examples of the groups which R may represent are hydrogen, methyl, ethyl, isopropyl, pentyl, hexyl, etc. The alkyl group represented by R may additionally be substituted with cyano, hydroxy, methoxy, etc.

Examples of groups representative of Q are a hydrogen atom, a hydroxy radical or a radical having the formula $-NHCOR^3$ or $-NHSO_2R^3$ wherein $R^3$ is as described previously such as $-NHCOCH_3$, $-NHCOC_2H_5$, $-NHCOC_6H_{13}$, $-NHCOC_2H_4CN$, $-NHCOC_3H_6SO_2NH_2$, $-NHCOCH_2C_6H_5$, $-NHCOC_6H_4COOH$, $-NHSO_2CH_3$, $-NHSO_2C_6H_4CN$, $-NHSO_2C_6H_4Cl$, $-NHSO_2C_2H_5$, $-NHCOC_3H_6SO_3H$, $-NHSO_2C_6H_4OCH_3$, etc.

Examples of the groups which G may represent are hydroxy, salts thereof such as alkali metal (e.g., $-O^{\ominus}Li^{\oplus}$, $-O^{\ominus}K^{\oplus}$, $-O^{\ominus}Na^{\oplus}$) salts and photographically inactive ammmonium salts thereof such as $-O^{\ominus\oplus}NH_4$, $-O^{\ominus\oplus}NH(CH_3)_3$, $-O^{\ominus\oplus}N(C_2H_5)_4$,

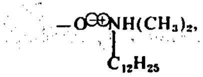, $-O^{\ominus\oplus}NH(C_{12}H_{25})_3$, $-O^{\ominus\oplus}NH(C_2H_5)_3$,

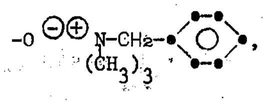, i.e., a trialkyl or tetralkyl ammonium salt (sometimes called "amine salts") which does not adversely affect the photographic utility of the magenta image dye-providing compound or the physical or chemical processes which occur during development of the image.

G may also advantageously represent a hydrolyzable acyloxy group having the formula

 or 

wherein $R^4$ is as described previously. Non-limiting examples of these hydrolyzable groups are

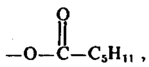, 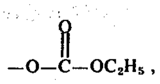, 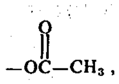,

, 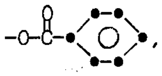, ,

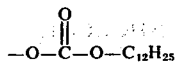 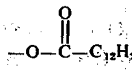,

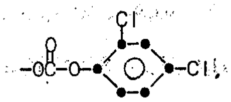

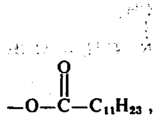, etc.

Examples of the groups which Z and $Z^1$ may represent are $-CF_3$, a cyano radical (—CN), a carboxylic acid ester such as $-COOCH_3$, $-COOC_{11}H_{23}$, $-COOC_2H_5$, $-COOC_6H_5$,

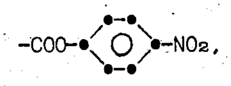, $-COOC_{12}H_{25}$,

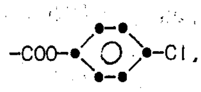, etc.; a carboxy radical including salts thereof, such asa alkali metal salts or photographically inactive ammonium salts (e.g., —COOH, $-COO^{\ominus}Li^{\oplus}$, $-COO^{\ominus}K^{\oplus}$, $-COO^{\ominus}Na^{\oplus}$, $-COO^{\ominus}NH_4^{\oplus}$, etc.), a nitro radical ($-NO_2$) in the 2- or 3- position relative to the azo linkage, a fluorosulfonyl radical ($-SO_2F$); a halogen atom such as chloro, fluoro or bromo; $-SO_2CH_3$, $-SO_2C_2H_5$,

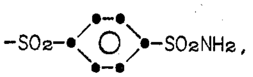, $-SO_2C_6H_5$, $-SO_2CH_2C_6H_5$, $-SO_2C_6H_{13}$,

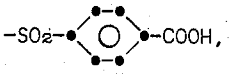, $-SO_2C_2H_4CN$, $-SO_2C_3H_6OH$,

, , etc.; $-COCH_3$, $-COC_3H_7$, $-COCH_2C_6H_5$, $-COC_5H_{11}$, $-SO_2NH_2$, $-SO_2NHCH_3$, $-SO_2NHC_2H_5$, $-SO_2N(CH_3)_2$, $-SO_2NHCH_2C_6H_5$,

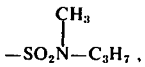,

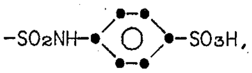, $-SO_2NHC_2H_4ON$, $-SO_2NHCOC_6H_5$, $-SO_2NHCOCH_3$, $-SO_2NHCOC_3H_7$,

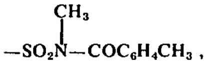, $-SO_2NHCOCH_2C_6H_5$, $-SO_2NHC_2H_4SO_3H$,

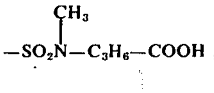, $-SO_2NHSO_2CH_3$,

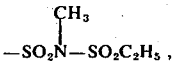, $-SO_2NHSO_2C_6H_5$,

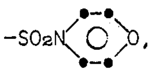, 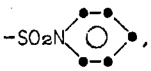, $-SO_2NHSO_2C_2H_4CN$, $-SO_2NHSO_2C_3H_6OH$, $-SO_2NHSO_2C_6H_4OCH_3$, etc.; $-CONH_2$, $-CON(C_2H_5)_2$,

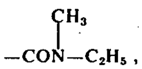, $-CONHCH_3$, $-CONHC_5H_{11}$, etc.

Examples of the groups which $R^1$ may represent are hydrogen, $-CH_3$, $-C_2H_5$, $-C_3H_7$, $-C_4H_9$, isopropyl, methoxy, ethoxy, butoxy, isopropoxy, chloro, bromo, fluoro, and the alkyl groups represented by $R^1$ may additionally be substituted with cyano, hydroxy, methoxy, etc.

Examples of electron withdrawing groups which D may represent are cyano, a sulfo radical including salts thereof, such as alkali metal or photographically inactive ammonium salts (e.g., $-SO_3H$, $-SO_3^{\ominus}Li^{\oplus}$, $SO_3^{\ominus}K^{\oplus}$, $-SO_3^{\ominus}Na^{\oplus}$, $-SO_3^{\ominus}NH_4^{\oplus}$, etc.); $-SO_2F$, chloro, bromo, fluoro, a $-SO_3C_6H_5$ radical,

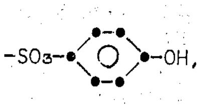, 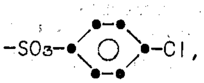,

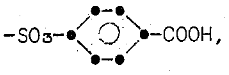, 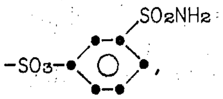,

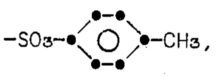, 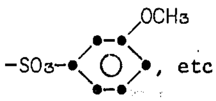, etc., $-SO_2CH_3$, $-SO_2C_2H_5$, , $-SO_2C_6H_{13}$, $-SO_2C_2H_4CN$, $-SO_2C_6H_5$, $-SO_2CH_2C_6H_5$,

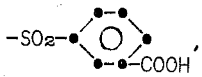, 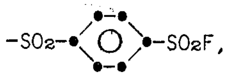, $-SO_2C_2H_4OH$,

, $-SO_2(CH_2)_3SO_2NH_2$, $-SO_2(CH_2)_3SO_3H$, etc., $-SOCH_3$, $-SOC_2H_5$,

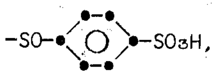, $-SOC_6H_{13}$, $-SOC_2H_4CN$, $-SOC_6H_5$, $-SO_2CH_2C_6H_5$, , $-SOC_2H_4OH$, $-SO(CH_2)_3SO_2NH_2$, $-SO_2(CH_2)_3SO_3H$, etc., as well as a sulfamoyl or carbamoyl radical as described for Z such as $-SO_2NH_2$, $-SO_2NHCH_3$, $-SO_2NHC_2H_5$, $-SO_2N(CH_3)_2$, $-SO_2NHCH_2C_6H_5$, 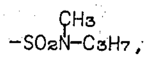,

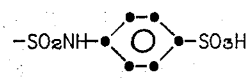, $-SO_2NHC_2H_5CN$, $-SO_2NHCOC_6H_5$, $-SO_2NHCOCH_3$, $-SO_2NHCOC_3H_7$,

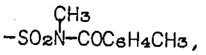, $-SO_2NHCOCH_2C_6H_5$, $-SO_2NHC_2H_4SO_3H$, 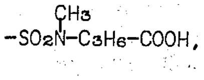, $-SO_2NHSO_2CH_3$,

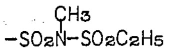, $-SO_2NHSO_2C_6H_5$, etc.; $-CONH_2$, $-CON(C_2H_5)_2$, 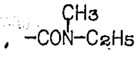, $-CONHCH_3$, $-CONHC_5H_{11}$.

In a preferred embodiment of this invention car is a moiety which, as a function of oxidation under alkaline conditions, releases a dye having a mobility different than said compound;

$R^2$ represents an alkylene radical having 1 to about 4 carbon atoms, phenylene or phenylene substituted with carboxy, chloro, methyl or methoxy;

*n* is an integer having a value of 0;

R represents hydrogen;

J represents sulfonyl;

*m* is an integer having a value of 0 or 1;

Q is in the 5-position relative to G and represents hydroxy, $-NHCOR^3$ or $-NHSO_2R^3$ wherein $R^3$ represents an alkyl radical having 1 to about 4 carbon atoms; an alkyl radical having 1 to about 4 carbon atoms substituted with hydroxy, cyano, sulfamoyl, carboxy or sulfo; benzyl, phenyl or phenyl substituted with carboxy, chloro, methyl, methoxy or sulfamoyl;

G represents a hydroxy radical or a hydrolyzable acyloxy group having the formula:

$$-O\overset{O}{\overset{\|}{C}}R^4 \quad \text{or} \quad -O\overset{O}{\overset{\|}{C}}OR^4$$

wherein $R^4$ is an alkyl radical having 1 to about 18 carbon atoms, phenyl or substituted phenyl having 6 to about 18 carbon atoms;

*r* is an integer having a value of 1;

Z represents cyano, trifluoromethyl, fluorosulfonyl, chloro, fluoro, bromo, a nitro radical in the 2- or 3-position relative to the azo linkage, alkylsulfonyl having 1 to about 7 carbon atoms, alkylsulfonyl having 1 to about 6 carbon atoms substituted with hydroxy, phenyl, cyano, sulfamoyl, carboxy, fluorosulfonyl or sulfo; a sulfamoyl radical having the formula $-SO_2NHR^6$ wherein $R^6$ is hydrogen, an alkyl radical having 1 to about 4 carbon atoms, or an alkyl radical having 1 to about 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;

$Z^1$ represents hydrogen;

$R^1$ represents hydrogen, methoxy, chloro or fluoro;

D represents chloro, bromo, alkylsulfonyl having 1 to about 6 carbon atoms, alkylsulfonyl having 1 to about 6 atoms substituted with chloro, fluoro, hydroxy, phenyl, cyano, sulfamoyl, carboxy, sulfo, sulfamoylphenyl, carboxyphenyl, chlorophenyl, cyanophenyl, methylphenyl, nitrophenyl; phenylsulfonyl; or a sulfamoyl radical of the formula $-SO_2NR^5R^6$ wherein $R^5$ is hydrogen or methyl, $R^6$ is hydrogen, an alkyl radical of 1 to about 8 carbon atoms, an alkyl radical having 1 to about 6 carbon atoms substituted with hydroxy, cyano, sulfamoyl, carboxy, or sulfo; benzyl; phenyl or phenyl substituted with hydroxy, sulfamoyl, carboxy or sulfo; or $R^5$ and $R^6$ taken together with the nitrogen atom to which they are bonded represents morpholino.

Even more preferred image dye-providing compounds are those having the formula

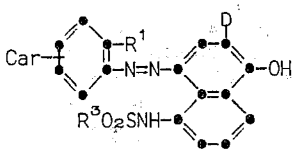

wherein $R^1$ represents hydrogen or chloro;

$R^3$ represents an alkyl radical having 1 to about 4 carbon atoms;

D represents an alkylsulfonyl radical having 1 to about 5 carbon atoms, benzylsulfonyl, a sulfamoyl radical having the formula $-SO_2NHR^6$ wherein $R^6$ is an alkyl radical having 1 to about 8 carbon atoms.

Of these compounds those wherein Car is in the 4-position relative to the azo linkage when $R^1$ is hydrogen and Car is in the 5-position when $R^1$ is chloro; $R^3$ represents methyl and D represents $-SO_2CH_2C_6H_5$, $-SO_2NHC_4H_9$-t or $-SO_2NHCH_3$ are especially preferred.

Other especially preferred image dye-providing compounds are those having the formula:

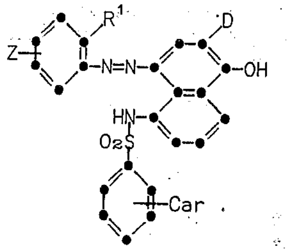

wherein

D represents $-SO_2NHCH_3$ or $-SO_2NHC_4H_9t$;

$R^1$ represents hydrogen or chloro;

Z represents 5-sulfamoyl when $R^1$ is 2-chloro; and when $R^1$ is hydrogen Z represents 4-sulfamoyl, 3-methylsulfonyl or 3-nitro.

Even more especially preferred compounds are those having Formulas I, II and III above wherein Car- represents a radical of the formula:

IV.

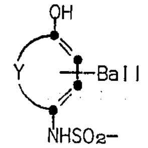

wherein Ball represents an organic ballasting group of such size and configuration as to render the compound nondiffusible during development in the alkaline processing composition and Y represents the carbon atoms necessary to complete a benzene or naphthalene nucleus including substituted benzene or naphthalene. When Y represents the atom necessary to complete a naphthalene nucleus, Ball can be attached to either ring thereof. Preferred ballasting groups are those wherein -Ball represents $$-\overset{O}{\overset{\|}{C}}NH-Ball \quad \text{or} \quad -SO_2NH-Ball.$$

Examples of some preferred carriers are as follows:

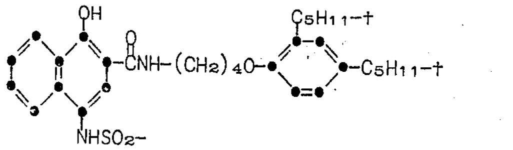

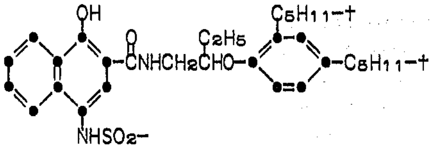

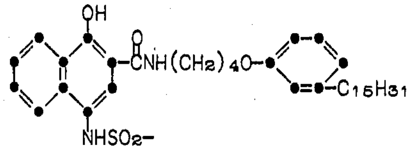

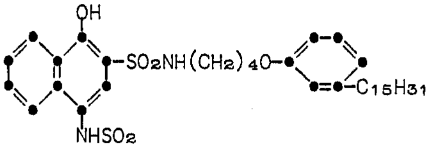

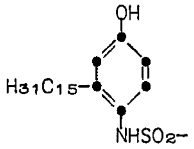

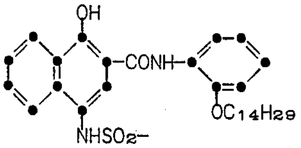

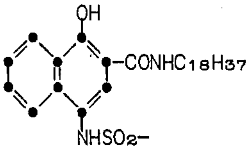

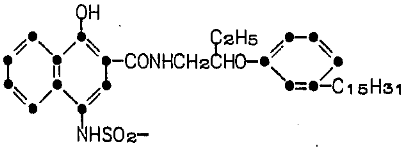

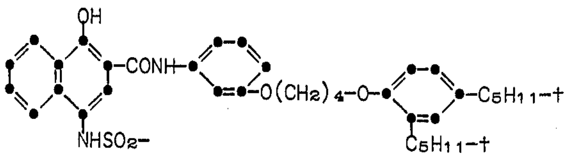

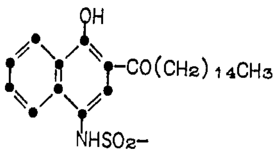

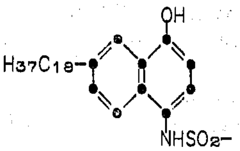

The nature of the ballast group (Ball) in the Formula III for the compounds described above is not critical as long as it confers nondiffusibility to the compounds. Typical ballast groups include long straight or branched chain alkyl radicals linked directly or indirectly to the compound as well as aromatic radicals of the benzene and naphthalene series indirectly attached or fused directly to the benzene nucleus, etc. Useful ballast groups generally have at least 8 carbon atoms such as a substituted or unsubstituted alkyl group of 8 to 22 carbon atoms, an amide radical having 8 to 30 carbon atoms, a keto radical having 8 to 30 carbon atoms, etc., and may even comprise a polymer backbone. Especially preferred compounds are those wherein the ballast is attached to the benzene nucleus through a carbamoyl radical (—NHCO—) or a sulfamoyl radical ($—SO_2NH—$) in which the nitrogen is adjacent the ballast group.

In addition to the ballast, the benzene nucleus in the above formula may have groups or atoms attached thereto such as the halogens, alkyl, aryl, alkoxy, aryloxy, nitro, amino, alkylamino, arylamino, amido, cyano, alkylmercapto, keto, carboalkoxy, heterocyclic groups, etc.

In a preferred embodiment of this invention CAR is a moiety which as a function of oxidation under alkaline conditions, releases a dye having a mobility different than that of the image dye-providing compounds.

The preferred novel dyes which are released from the carrier moieties as a function of oxidation under alkaline conditions may be represented by the following formulas:

V.

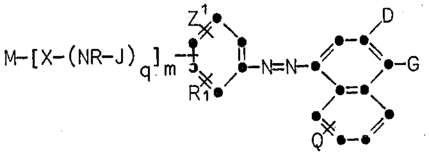

VI.

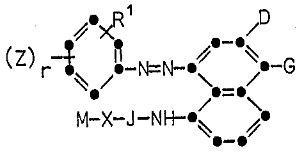

VII.

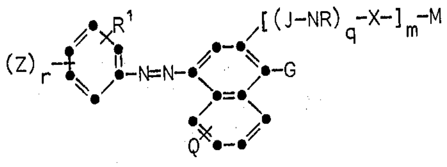

wherein

M represents $NH_2SO_2$-, $HSO_2$- or lower alkyl-NH-; and

X, R, J, q, r, m, Q, G, Z, $Z^1$, D and $R^1$ are as described previously. The preferred released dyes, of course, correspond to the above mentioned preferred image dye-providing compounds set forth above.

When M represents -$SO_2H$, the dyes thus represented may be released by the reactions described in Bloom, U.S. Pat. No. 3,443,940, in Puschel, U.S. Pat. No. 3,628,952 and Gompf, U.S. Pat. No. 3,698,897. When M represents lower alkyl-NH- (i.e., an alkyl group having 1 to about 4 carbon atoms), the dyes thus represented may be released by the reactions described in Hinshaw et al., U.S. Ser. No. 326,628. The especially preferred released dyes of our invention are those represented by Formulas V, VI and VII above when M represents -$SO_2NH_2$. These dyes may be released by the reactions described in Fleckenstein et al, U.S. Ser. No. 282,796 from the carrier moieties described by Formula IV.

A suitable process for producing a photographic transfer image in color using the compounds of our invention, for example those wherein Car is as shown in Formula IV, comprises the steps of:

1. treating the above-described photosensitive element with an alkaline processing composition in the presence of a silver halide developing agent to effect development of each of the exposed silver halide emulsion layers, thereby oxidizing the developing agent and the oxidized developing agent in turn cross-oxidizing the sulfonamido compound;
2. forming an imagewise distribution of diffusible released dye as a function of the imagewise exposure of each of the silver halide emulsion layers by cleaving each cross-oxidized sulfonamido compound; and
3. diffusing to a dye image-receiving layer at least a portion of each of the imagewise distributions of diffusible released dye to provide an image.

The photosensitive element in the above-described process can be treated with an alkaline processing composition to effect or initiate development in any manner. A preferred method for applying processing composition is by use of a rupturable container or pod which contains the composition. In general, the processing composition employed in our system contains the developing agent for development, although the composition could also just be an alkaline solution where the developer is incorporated in the photosensitive element, in which case the alkaline solution serves to activate the incorporated developer.

A photographic film unit according to our invention which is adapted to be processed by passing the unit between a pair of juxtaposed pressure-applying members, comprises:

1. a photosensitive element as described above;
2. a dye image-receiving layer; and
3. means for discharging an alkaline processing composition within the film unit such as a rupturable container which is adapted to be positioned during processing of the film unit so that a compressive force applied to the container by the pressure-applying members will effect a discharge of the contents of the container within the film unit;

the film unit containing a silver halide developing agent.

The dye image-receiving layer in the above-described film unit can be located on a separate support adapted to be superimposed on the photosensitive element after exposure thereof. Such image-receiving elements are generally disclosed, for example, in U.S. Pat. No. 3,362,819. When the means for discharging the processing composition is a rupturable container, typically it is positioned in relation to the photosensitive element and the image-receiving element so that a compressive force applied to the container by pressure-applying members, such as found in a camera designed for in-camera processing, will effect a discharge of the contents of the container between the image-receiving element and the outermost layer of the photosensitive element. After processing, the dye image-receiving element is separated from the photosensitive element.

The dye image-receiving layer in the above-described film unit can also be located integral with the photosensitive silver halide emulsion layer. One useful format for integral receiver-negative photosensitive elements is disclosed in Belgian Pat. No. 757,960. In such an embodiment, the support for the photosensitive element is transparent and is coated with an image-receiving layer, a substantially opaque light reflective layer, e.g., $TiO_2$, and then the photosensitive layer of layers described above. After exposure of the photosensitive element, a rupturable container containing an alkaline processing composition and an opaque process sheet are brought into superimposed position. Pressure-applying members in the camera rupture the container and spread processing composition over the photosensitive element as the film unit is withdrawn from the camera. The processing composition develops each exposed silver halide emulsion layer and dye images are formed as a function of development which diffuse to the image-receiving layer to provide a position, right-reading image which is viewed through the transparent support on the opaque reflecting layer background.

Another format for integral negative-receiver photosensitive elements in which the present invention can be employed is disclosed in Belgian Pat. No. 757,959. In this embodiment, the support for the photosensitive element is transparent and is coated with the image-receiving layer, a substantially opaque, light-reflective layer and the photosensitive layer or layers described above. A rupturable container containing an alkaline processing composition and an opacifier is positioned adjacent to the top layer and a transparent top sheet. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light insensitive. The processing composition develops each silver halide layer and dye images are formed as a result of development which diffuse to the image-receiving layer to provide a right-reading image that is viewed through the transparent support on the opaque reflecting layer background.

Still other useful integral formats in which our sulfonamido compounds can be employed are described in U.S. Pat. Nos. 3,415,644; 3,415,645; 3,415,646; 3,647,437; and 3,635,707.

The film unit or assembly of the present invention can be used to produce positive images in single or multicolors. In a three-color system, each silver halide emulsion layer of the film assembly will have associated therewith an image dye-providing material possessing a predominant spectral absorption within the region of the visible spectrum to which said silver halide emulsion is sensitive, i.e., the blue-sensitive silver halide emulsion layer will have a yellow image dye-providing material associated therewith, the green-sensitive silver halide emulsion layer will have a magenta image dye-providing material associated therewith, and the red-sensitive silver halide emulsion layer will have a cyan image dye-providing material associated therewith. The image dye-providing material associated with each silver halide emulsion layer can be contained either in the silver halide emulsion layer itself or in a layer contiguous to the silver halide emulsion layer. The magenta image dye-providing material will, of course, be a compound of this invention.

When G is a hydrolyzable acyloxy group, the absorption spectrum of the azo dye is shifted to shorter wavelength. "Shifted dyes" of this type absorb light outside the range to which the associated silver halide layer is sensitive. The use of certain related shifted azo dye developers is described in U.S. Pat. No. 3,307,947 issued Mar. 7, 1967. The shifted dye-providing materials of this invention can be advantageously contained in the silver halide emulsion layer without substantially reducing the sensitivity of the layer. The acyloxy group is hydrolyzed by the alkaline processing composition, releasing the cyan dye of the desired hue. The yellow and cyan image dye-providing materials can be selected from a variety of materials such as those compounds described by Fleckenstein et al U.S. Ser. No. 282,796, mentioned previously. Additional useful cyan image dye-providing materials are described in co-filed Haase et al. application Ser. No. 439,789, filed Feb. 5, 1974 entitled "Photographic Materials and Compounds Useful Therein".

The concentration of the compounds, which preferably are alkalicleavable upon oxidation, that are employed in the present invention can be varied over a wide range depending upon the particular compound employed and the results which are desired. For example, the image dye-providing compounds of the present invention can be coated in layers as dispersions in a hydrophilic film-forming natural or synthetic polymer, such as gelatin, polyvinyl alcohol, etc., which is adapted to be permeated by aqueous alkaline processing composition. Preferably, the ratio of dye providing compoung to polymer will be about 0.25 to about 4.0. The present compounds may then be incorporated in a gelatin by techniques known in the art (e.g., a high boiling, water immiscible organic solvent or a low boiling or water miscible organic solvent).

Depending upon which Car is used on the present compounds, a variety of silver halide developing agents can be employed in our invention. If the carrier used is that of Formula IV, any silver halide developing agent can be used as long as it cross-oxidizes with the image dye-providing compounds used herein. The developer can be employed in the photosensitive element to be activated by the alkaline processing composition. Specific examples of developers which can be employed in our invention include hydroquinone, aminophenols, e.g., N-methylamino-phenol, Phenidone (1-phenyl-3-pyrazolidone) trademark of Ilford, Ltd.; Dimezone (1-phenyl-4,4-dimethyl-3-pyrazolidone) trademark of Eastman Kodak Company; 1-phenyl-4-methyl-4-hydroxymethyl-3-pyrazolidone, N,N-diethyl-p-phenylenediamine, 3-methyl-N,N-diethyl-p-phenylenediamine, 3-methoxy-N,N-diethyl-p-phenylenediamine, etc. The black-and-white developers in this list are preferred, in that they have a reduced propensity of staining the dye image-receiving layer.

In a preferred embodiment of our invention, the silver halide developer in our process becomes oxidized upon development and reduces silver halide to silver metal. The oxidized developer then cross-oxidizes the sulfonamido-phenol or sulfonamido-naphthol dye-releasing compound. The product of cross-oxidation then undergoes alkaline hydrolysis, thus releasing an imagewise distribution of diffusible anionic dye which then diffuses to the receiving layer to provide the dye image. The diffusible moiety is transferable in alkaline processing composition either by virtue of its self-diffusivity or by having attached to it one or more solubilizing groups such as $-COOH$, $-SO_3H$, $-SO_2NR^5R^6$, OH, etc. (where $R^5$ and $R^6$ are as described previously with at least one being hydrogen).

In using the especially preferred dye-releasing compounds according to our invention, the production of diffusible dye images is a function of development of the silver halide emulsions with a silver halide developing agent to form either negative or direct positive silver images in the emulsion layers. If the silver halide emulsion employed forms a direct positive silver image, such as a direct positive internal-image emulsion or a solarizing emulsion, which develops in unexposed areas, a positive image can be obtained on the dye image-receiving layer. After exposure of the film unit, the alkaline processing composition permeates the various layers to initiate development in the unexposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction in a preferred embodiment of our invention, to release the preformed dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit lowers the pH of the film unit (or the image-receiving unit) to stabilize the image.

Internal-image silver halide emulsions useful in those embodiments wherein a dye is released as a function of oxidation are directpositive emulsions that form latent images predominantly inside the silver halide grains, as distinguished from silver halide grains that form latent images predominantly on the surface thereof. Such internal-image emulsions are described by Davey et al in U.S. Pat. No. 2,592,250, issued Apr. 8, 1952, and elsewhere in the literature. Other useful emulsions are described in U.S. Pat. No. 3,761,276, dated Sept. 25, 1973. Internal-image silver halide emulsions can be defined in terms of the increased maximum density obtained when developed with "internal-type" developers over that obtained when developed with "surface-type" developers. Suitable internal-image emulsions are those which, when measured according to normal photographic techniques by coating a test portion of the silver halide emulsion on a transparent support, exposing to a light-intensity scale having a fixed time between 0.01 and 1 second, and developing for 3 minutes at 20°C. in Developer A below ("internal-type" developer), have a maximum density at least five times the maximum density obtained when an equally exposed silver halide emulsion is developed for 4 minutes at 20°C. in Developer B described below ("surface-type" developer). Preferably, the maximum density in Developer A is at least 0.5 density unit greater than the maximum density in Developer B.

| DEVELOPER A | |
|---|---|
| Hydroquinone | 15 g. |
| Monomethyl-p-aminophenol sulfate | 15 g. |
| Sodium sulfite (desiccated) | 50 g. |
| Potassium bromide | 10 g. |
| Sodium hydroxide | 25 g. |
| Sodium thiosulfate | 20 g. |
| Water to make one liter. | |

| DEVELOPER B | |
|---|---|
| P-hydroxyphenylglycine | 10 g. |
| Sodium carbonate | 100 g. |
| Water to make one liter. | |

The internal-image silver halide emulsions when processed in the presence of fogging or nucleating agents provide direct positive silver images. Such emulsions are particularly useful in the above-described embodiment. Suitable fogging agents include the hydrazines disclosed in Ives U.S. Pat. Nos. 2,588,982 issued Mar. 11, 1952, and 2,563,785 issued Aug. 7, 1951; the hydrazides and hydrazones disclosed in Whitmore U.S. Pat. No. 3,227,552 issued Jan. 4, 1966; hydrazone quaternary salts described in Lincoln and Heseltine U.S. Pat. No. 3,615,615 issued Oct. 26, 1971; hydrazone containing polymethine dyes described in Spence and Janssen U.S. Pat. No. 3,718,470 issued Feb. 27, 1973; or mixtures thereof. The quantity of fogging agent employed can be widely varied depending upon the results desired. Generally, the concentration of fogging agent is from about 0.4 to about 8 grams per mole of silver in the photosensitive layer in the photosensitive element or from about 0.1 to about 2 grams per liter of developer if it is located in the developer. The fogging agents described in U.S. Pat. Nos. 3,615,615 and 3,718,470, however, are preferably used in concentrations of about 0.5 to 10.0 grams per mole of silver in the photosensitive layer.

The solarizing direct-positive silver halide emulsions useful in the above-described embodiment are well-known silver halide emulsions which have been effectively fogged either chemically, such as by the use of reducing agents, or by radiation to a point which corresponds approximately to the maximum density of the reversal curve as shown by Mees, *The Theory of the Photographic Process*, published by the Macmillan Co., New York, New York, 1942, pages 261–297. Typical methods for the preparation of solarizing emulsions are shown by Groves British Patent 443,245, Feb. 25, 1936, who subjected emulsions to Roentgen rays "until an emulsion layer formed therefrom, when developed without preliminary exposure, is blackened up to the apex of its graduation curve"; Szaz British Pat. No. 462,730, Mar. 15, 1937, the use of either light or chemicals such as silver nitrate, to convert ordinary silver halide emulsions to solarizing direct positive emulsions; and Arens U.S. Pat. No. 2,005,837, June 25, 1935, the use of silver nitrate and other compounds in conjunction with heat to effect solarization. Particularly useful are the fogged direct-positive emulsions of Berriman U.S. Pat. No. 3,367,778; Illingsworth U.S. Pat. Nos. 3,501,305, 3,501,306 and 3,501,307; and combinations thereof.

Other embodiments in which our imaging chemistry can be employed include the techniques described in U.S. Pat. Nos. 3,227,550, 3,227,551, 3,227,552 and 3,364,022.

If photographic elements are used which contain compounds of this invention wherein Car is a silver halide developer as described, for example, in U.S. Pat. No. 2,983,606, when the liquid processing composition is applied, it permeates the emulsion to provide a solution of the dye developer substantially uniformly distributed in the emulsion. As the exposed silver halide emulsion is developed to a negative silver image, the oxidation product of the dye developer is immobilized or precipitated in situ with the developed silver, thereby providing an imagewise distribution of unoxidized dye developer dissolved in the liquid processing composition. This immobilization is apparently due, at least in part, to a change in the solubility characteristics of the dye developer upon oxidation. At least part of this imagewise distribution of unoxidized dye-developer is transferred to a superimposed image-receiving layer to provide a transfer image.

Negative silver halide emulsions useful in certain embodiments of this invention, such as the above, can comprise, for example, silver chloride, silver bromide, silver chlorobromide, silver bromoiodide, silver chlorobromiodide or mixtures thereof. The emulsions can be coarse or fine-grain and can be prepared by any of the well-known procedures, e.g., single-jet emulsions such as those described in Trivelli and Smith, *The Photographic Journal*, Vol. LXXIX, May, 1939, (pp. 330–338), double-jet emulsions, such as Lippmann emulsions, ammoniacal emulsions, thiocyanate or thioether ripened emulsions such as those described in Nietz et al U.S. Pat. No. 2,222,264 issued Nov. 19, 1940; Illingsworth U.S. Pat. No. 3,320,069 issued May 16, 1967; and Jones U.S. Pat. No. 3,574,628 issued Apr. 13, 1971. The emulsions may be monodispersed regular-grain emulsions such as the type described in Klein and Moisar, *J. Phot. Sci.*, Vol. 12, No. 5, Sept./Oct., 1964 (pp. 242–251).

Another embodiment of our invention uses the image-reversing technique disclosed in British Pat. No.

904,364, page 19, lines 1–41. In this system our dye-providing compounds are used in combination with physical development nuclei in a nuclei layer contiguous to the photosensitive silver halide negative emulsion layer. The film unit contains a silver halide solvent, preferably in a rupturable container with the alkaline processing composition.

The various silver halide emulsion layers of a color film assembly of the invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layer for absorbing or filtering blue radiation that may be transmitted through the blue-sensitive layer. If desired, the selectivity sensitized silver halide emulsion layers can be disposed in a different order, e.g., the blue-sensitive layer first with respect to the exposure side, followed by the red-sensitive and green-sensitive layers.

The rupturable container employed in this invention can be of the type disclosed in U.S. Pat. Nos. 2,543,181; 2,643,886; 2,653,732; 2,724,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

In a color film unit according to this invention, each silver halide emulsion layer containing a dye image-providing material or having the dye image-providing material present in a contiguous layer may be separated from the other silver halide emulsion layers in the imageforming portion of the film unit by materials including gelatin, calcium alginate, or any of those disclosed in U.S. Pat. No. 3,384,483, polymeric materials such as polyvinylamides as disclosed in U.S. Pat. No. 3,421,892, or any of those disclosed in French Pat. No. 2,028,236 or U.S. Pat. Nos. 2,992,104; 3,043,692; 3,044,873; 3,061,428; 3,069,263; 3,069,264; 3,121,011; and 3,427,158.

Generally speaking, except where noted otherwise, the silver halide emulsion layers in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 1 to 7 microns in thickness; and the alkaline solution-permeable polymeric interlayers, e.g., gelatin, are about 1 to 5 microns in thickness. Of course, these thicknesses are approximate only and can be modified according to the product desired.

Any material can be employed as the image-receiving layer in this invention as long as the desired function of mordanting or otherwise fixing the dye images will be obtained. The particular material chosen will, of course, depend upon the dye to be mordanted. If acid dyes are to be mordanted, the image-receiving layer can contain basic polymeric mordants such as polymers of amino guanidine derivatives of vinyl methyl ketone such as described in Minsk U.S. Pat. No. 2,882,156, issued Apr. 14, 1959, and basic polymeric mordants such as described in Cohen et al. U.S. Pat. No. 3,625,694, issued Dec. 7, 1971; U.S. Pat. No. 3,709,690, issued Jan. 9, 1973; and U.S. application Ser. No. 400,778, filed Sept. 26, 1973, and now U.S. Pat. No. 3,898,088. See also U.S. application Ser. No. 412,992 of Burness et al; filed Nov. 5, 1973, and now U.S. Pat. No. 3,859,096.

Preferred mordants are cationic mordants such as polymeric compounds composed of a polymer having quaternary nitrogen groups and at least two aromatic nuclei for each quaternary nitrogen in the polymer cation (i.e., having at least two aromatic nuclei for each positively charged nitrogen atom), such polymeric compounds being substantially free of carboxy groups. Useful mordants of this type are comprised of units of the following formula in copolymerized relationship with units of at least one other ethylenically unsaturated monomer:

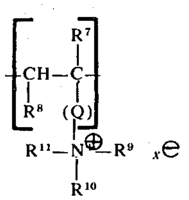

wherein $R^7$ and $R^8$ each represent a hydrogen atom or a lower alkyl radical (of 1 to about 6 carbon atoms) and $R^8$ can additionally be a group containing at least one aromatic nucleus (e.g., phenyl, naphthyl, tolyl); Q can be a divalent alkylene radical (of 1 to about 6 carbon atoms), a divalent arylene radical, a divalent aralkylene radical, a divalent arylenealkylene radical, such as

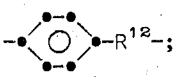

a

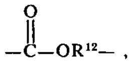 , 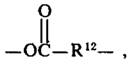 , or 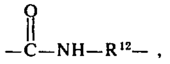 , wherein $R^{12}$ is an alkylene radical, or $R^8$ can be taken together with Q to form a

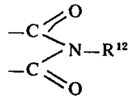 group;

$R^9$, $R^{10}$ and $R^{11}$ can be alkyl, aralkyl or aryl, or $R^9$ and $R^{10}$ and the nitrogen atom to which they are attached can together with Q represent the atoms and bonds necessary to form a quaternized nitrogen-containing heterocyclic ring, and $R^-$ is a monovalent negative salt-forming radical or atom in ionic relationship with the positive salt-forming radical, wherein said polymer is substantially free of carboxy groups and wherein the positive salt forming radical of said polymer comprises at least two aryl groups for each quaternary nitrogen atom in said polymer. In one preferred embodiment, Q represents a phenylene or substituted phenylene radical and $R^9$, $R^{10}$ and $R^{11}$ are the same or different and represent alkyl groups, the sum of their carbon atoms exceeding 12. These preferred polymeric cationic mordants are described further in the above-mentioned U.S. Pat. No. 3,709,690 and U.S. application Ser. No. 400,778, incorporated herein by reference.

Other mordants useful in our invention include poly-4-vinylpyridine, the 2-vinyl pyridine polymer methyl-p-toluene sulfonate and similar compounds described in Sprague et al U.S. Pat. No. 2,484,430, issued Oct. 11, 1949, and cetyl trimethylammonium bromide, etc. Effective mordanting compositions are also described in Whitmore U.S. Pat. No. 3,271,148 and Bush U.S. Pat. No. 3,271,147, both issued Sept. 6, 1966.

Generally, good results are obtained when the image-receiving layer, preferably alkaline solution-permeable, is transparent and about 0.25 to about 0.40 mil in thickness. This thickness, of course, can be modified depending upon the result desired. The image-receiving layer can also contain ultraviolet absorbing materials to protect the mordanted dye images from fading due to ultraviolet light, brightening agents such as the stilbenes, coumarins, traizines, oxazoles, dye stabilizers such as the chromanols, alkylphenols, etc.

Use of a pH-lowering material in the dye image-receiving element of a film unit according to the invention will usually increase the stability of the transferred image. Generally, the pH-lowering material will effect a reduction in the pH of the image layer from about 13 or 14 to at least 11 and preferably 4–8 within a short time after imbibition. For example, polymeric acids as disclosed in U.S. Pat. No. 3,362,819, or solid acids or metallic salts, e.g., zinc acetate, zinc sulfate, magnesium acetate, etc., as disclosed in U.S. Pat. No. 2,584,030 may be employed with good results. Such pH-lowering materials reduce the pH of the film unit after development to terminate development and substantially reduce further dye transfer and thus stabilize the dye image.

An inert timing or spacer layer can be employed in the practice of our invention over the pH-lowering layer which "times" or controls the pH reduction as a function of the rate at which alkali diffuses through the inert spacer layer. Examples of such timing layers include gelatin, polyvinyl alcohol or any of those disclosed in U.S. Pat. No. 3,455,686. The timing layer may be effective in evening out the various reaction rates over a wide range of temperatures, e.g., premature pH reduction is prevented when imbibition is effected at temperatures above room temperature, for example, at 95°–100°F. The timing layer is usually about 0.1 to about 0.7 mil in thickness. Expecially good results are obtained when the timing layer comprises a hydrolyzable polymer or a mixture of such polymers which are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material e.g., sodium hydroxide, sodium carbonate or an amine such as diethylamine, preferably possessing a pH in excess of 11, and preferably containing a developing agent as described previously. The solution also preferably contains a viscosity-increasing compound such as a high-molecular-weight polymer, e.g., a water-soluble ether inert to alkaline solutions such as hydroxyethyl cellulose or alkali metal salts of carboxymethyl cellulose such as sodium carboxymethyl cellulose. A concentration of viscosity-increasing compound of about 1 to about 5% by weight of the processing composition is preferred which will impart thereto a viscosity of about 100 cp. to about 200,000 cp. In certain embodiments of our invention, an opacifying agent, e.g., $TiO_2$, carbon black, pH indicator dyes, etc., may be added to the processing composition.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge.

The alkaline solution-permeable, substantially opaque, light-reflective layer employed in certain embodiments of photographic film units of our invention can generally comprise any opacifier dispersed in a binder as long as it has the desired properties. Particularly desirable are white light-reflective layers since they would be esthetically pleasing backgrounds on which to view a transferred dye image and would also possess the optical properties desired for reflection of incident radiation. Suitable opacifying agents include titanium dioxide, barium sulfate, zinc oxide, barium stearate, silver flake, silicates, alumina, zirconium oxide, zirconium acetyl acetate, sodium zirconium sulfate, kaolin, mica, or mixtures thereof in widely varying amounts depending upon the degree of opacity desired. The opacifying agents may be dispersed in any binder such as an alkaline solution-permeable polymeric matrix such as, for example, gelatin, polyvinyl alcohol, and the like. Brightening agents such as the stilbenes, coumarins, triazines and oxazoles can also be added to the light-reflective layer, if desired. When it is desired to increase the opacifying capacity of the light-reflective layer, dark-colored opacifying agents, e.g., carbon black, nigrosine dyes, etc., may be added to it, or coated in a separate layer adjacent to the light-reflective layer.

The supports for the photographic elements of this invention can be any material as long as it does not deleteriously effect the photographic properties of the film unit and is dimensionally stable. Typical flexible sheet materials include cellulose nitrate film, cellulose acetate film, poly(vinyl acetal) film, polystyrene film, poly(ethylene-terephthalate) film, polycarbonate film, poly-$\alpha$-olefins such as polyethylene and polypropylene film, and related films or resinous materials. The support can be from about 2 to about 9 mils in thickness.

The silver halide emulsions useful in our invention are well known to those skilled in the art and are described in *Product Licensing Index*, Vol. 92, Dec., 1971, publication 9232, p. 107, paragraph I, "Emulsion types"; they may be chemically and spectrally sensitized as described on page 107, paragraph III, "Chemical sensitization", and pp. 108–109, paragraph XV, "Spectral sensitization", of the above article; they can be protected against the production of fog and can be stabilized against loss of sensitivity during keeping by employing the materials described on p. 107, paragraph V, "Antifoggants and stabilizers", of the above article; they can contain development modifiers, hardeners, and coating aids as described on pp. 107–108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on p. 108, paragraph XI, "Plasticizers and lubricants", and paragraph VIII, "Vehicles", and p. 109, paragraph XVI, "Absorbing and filter dyes", of the above article; they and other layers in the photographic elements used in this invention may contain addenda which are incorporated by using the procedures described on p. 109, paragraph XVII, "Methods of addition", of the above article; and they can be coated by using the various techniques described on p. 109, paragraph XVIII, "Coating procedures", of the above article, the disclosures of which are hereby incorporated by reference.

It will be appreciated that there remains in the photographic element after transfer has taken place an imagewise distribution of dye in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. The imagewise distribution of dye may also diffuse out of the element into these baths, if desired, rather than to an image-receiving element. If a negative-working silver halide emulsion is employed in such photosensitive element, then a positive color image, such as a color transparency or motion-picture film, may be produced in this manner. If a direct-positive silver halide emulsion is employed in such photosensitive element, then a negative color image may be produced.

Preferably, when the desired dye image is retained in the image-forming unit, the image dye-providing materials are shifted (G is hydrolyzable acyloxy) and are incorporated in the silver halide emulsion layer. Improved processes are described in U.S. Ser. No. 422,390, filed Dec. 6, 1973.

The following examples are provided for a further understanding of the invention. The structures of all of the compounds were confirmed by their infrared and NMR spectra and in some cases by elemental analysis. The notation $C_5H_{11}$-t as used herein is an abbreviation for t-pentyl.

4-Amino-N-[4-(2,4-di-t-pentylphenoxy)-butyl]-1-hydroxy-2-naphthamide may be prepared as follows: 1-hydroxy-N-[4-(2,4-di-t-pentylphenoxy)-butyl]-2-napthamide (U.S. Pat. No. 2,474,293) is coupled with a diazotized p-anisidine (eg. 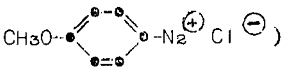 ).

The azo group of the compound thus prepared may then be reduced with sodium dithionite ($Na_2S_2O_4$) to the corresponding amine (see also U.S. Pat. No. 3,458,315, column 10).

EXAMPLE 1

Preparation of Dye-Releasing Redox (DRR) Compound No. 1

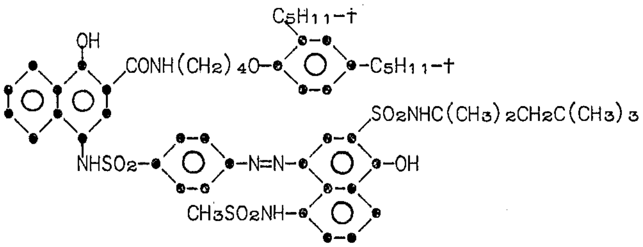

A diazonium solution was prepared by bubbling HCl gas into a suspension of 12.9 g. 4-p-aminophenylsulfonamideo-N-[(2,4-di-t-pentyl-phenoxy)butyl]-1-hydroxy-2-naphthamide in 130 ml. absolute ethanol. After cooling below −15°C., 2.7 g. isopentyl nitrite was added and the mixture stirred for 35 minutes.

5-Methanesulfonamido-1-hydroxy-2-t-octylsulfonamide (8.6 g.) was dissolved in a mixture of 30 ml. pyridine and 200 ml. absolute ethanol and cooled to −10°C. under nitrogen. The above diazonium solution was added over 20 minutes under nitrogen with cooling, stirred 2 hours at −10°C., and allowed to warm to room temperature overnight. The slurry of precipitated product was filtered off. It was recrystallized from 75 ml. tetrahydrofuran and reprecipitated by pouring slowly into 800 ml. hexane, yielding 12.8 g. (58%) of the DRR compound. The thin layer chromotography showed a faint trace of impurity. λmax in dimethylacetamide, τ565 nm.

Preparation of Intermediates a. The 5-methanesulfonamido-1-hydroxy-2-t-octylsulfonamide was prepared from 4.3 g. 5-bis(methanesulfonyl)amino-1-hydroxy-2-t-octylsulfonamide by room temperature hydrolysis in 10 ml. of 45% aqueous potassium hydroxide in 90 ml. ethanol for 3 hours. The mixture was acidified with concentrated HCl, diluted with water to give the crystalline product, 3.14 g., m.p. 168°–169°C.

b. The 5-bis(methanesulfonyl)amino-1-hydroxy-2-t-octylsulfonamide was obtained by refluxing 24.6 g. of 5-bis(methanesulfonyl)amino-1-methanesulfonyloxy-2-naphthalenesulfonyl chloride with 19.6 g. t-octylamine (1,1,3,3-tetramethylbutylamine) and 1.29 g. of diisopropylethylamine in 700 ml. dry dioxane for 18 hours. The dioxane solution was treated with activated charcoal, filtered, and poured into 3 l. water. This mixture was warmed to coagulate the product; and the gray solid was filtered off, washed with water, and dried. The crude product was purified by dissolving in acetone, filtering and precipitating with ether/hexane to yield 13.9 g. (55%), m.p. 212°–213°C.

c. The 5-bis(methanesulfonyl)amino-1-methanesulfonyloxy-2-naphthalenesulfonyl chloride was prepared from 7.1 g. of a paste of the sodium 2-sulfonate analogue in 15 ml. N-methylpyrrolidinone, which was added to 50 ml. of phosphoryl chloride with stirring under nitrogen, cooled in an ice-water bath. The mixture was stirred cold for 20 minutes, then for 10 minutes at room temperature. The resulting paste was poured into 1.5 l. ice-water, the solid filtered and washed with dilute hydrochloric acid. The moist solid was dissolved in 400 ml. tetrahydrofuran, treated with activated charcoal, with anhydrous magnesium sulfate to dry it, and then later filtered. The volume of filtrate was reduced to 25 ml. in a rotary evaporator and diluted with hexane to precipitate 5.4 g. of the sulfonyl chloride, m.p. 240°C. dec.

d. The sodium 5-bis(methanesulfonyl)amino-1-methane-sulfonyloxy-2-naphthalene sulfonate was prepared from 40 grams of the inner salt of 5-amino-1-hydroxy-2-naphthalene sulfonic acid by dissolving it in 100 ml. water and adjusting the pH to 7.5 with sodium hydroxide solution. Methanesulfonyl chloride (80 g.) was added dropwise over a 4 hour period, the mixture kept at 35° to 45°C. and pH 6.5 to 7.5 by cooling and by periodic addition of sodium hydroxide solution. After stirring for 1 hour at room temperature (pH about 7), the mixture was filtered and the precipitate freed as much as possible from water. It was slurried in 200 ml. of methanol, filtered, washed with ether and dried. Yield 78.5 grams.

e. The inner salt of 5-amino-1-hydroxy-naphthalene-2-sulfonic acid was obtained by sulfonation of 50 g. of purified 5-amino-1-naphthol in 100 g. sulfuric acid below 30°C. The mixture was stirred 1 hour at room temperature, then poured onto about 500 g. ice. The crude product was filtered off, then purified first by dissolving in dilute sodium hydroxide solution and precipitating with acetic acid and subsequently, by digesting the solid 2 l. water containing 100 ml. acetic acid and cooling. The yield was 48 g. (70%).

The products from each step of the above synthesis were characterized for identity and/or purity by thin layer chromatography, infrared spectrum and NMR spectrum in dimethylsulfoxide-$d_6$.

EXAMPLE 2

Preparation of DRR Compound No. 2

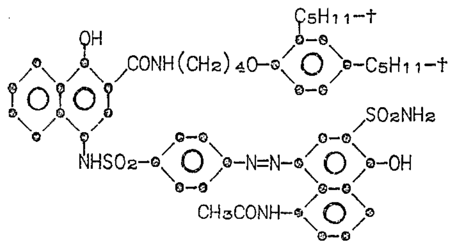

5-Acetamido-1-hydroxynaphthalene-2-sulfonamide (0.94 g.) was dissolved in 9 ml. pyridine and diluted with 120 ml. of 20% propionic acid in acetic acid. To this solution below 10°C. was added dropwise a cold solution of 2.09 g. 4-(4-aminobenzenesulfonamido)-N-[4-(2,4-di-t-pentyl-phenoxy)butyl]-1-hydroxy-2-naphthamide in 15 ml. tetrahydrofuran which has been previously diazotized with 0.4 ml. isopentyl nitrite over 30 minutes under a nitrogen atmosphere. The mixture was refrigerated overnight, filtered, and diluted to 300 ml. with water. The precipitate was filtered off and dried. The 2.42 g. of crude product was dissolved at 25° in 30 ml. acetic acid. The purified product (1.28 g. — 42% yield) precipitated on standing. λmax 557 nm.

Preparation of Intermediates a. The 5-acetamido-1-hydroxynaphthalene-2-sulfonamide was prepared by dissolving 10.8 g. of 5-acetamido-1-acetoxynaphthalene-2-sulfonyl chloride in 10 ml. dry chloroform and heating on the steam bath with 25.0 g. anhydrous ammonium carbonate for 2.5 hours. The yellow-brown solid was dissolved by heating with 50 ml. water on the steam bath for 4 hours. Acidification with dilute hydrochloric acid to pH5 caused the sulfonamide to precipitate. It was filtered off, washed and dried, yielding 5.61 g. (63%).

b. The 5-acetamido-1-acetoxynaphthalene-2-sulfonyl chloride was prepared by dropwise treatment of a suspension of dry sodium 5-acetamido-1-acetoxynaphthalene-2-sulfonate in 100 ml. phosphoryl chloride with 5.5 ml. dry dimethylformamide in a nitrogen atmosphere. The reaction mixture was stirred 1 hour and then poured over 600 ml. of crushed ice. The crude product was filtered and dissolved immediately in 500 ml. chloroform. The solution was treated with activated charcoal and dried over anhydrous magnesium sulfate to give 10.8 g. (44%) of a resinous yellow product which showed a single spot on a thin-layer chromotography.

c. The sodium 5-acetamido-1-acetoxy-2-naphalene-sulfonate was prepared by acetylation of 5-amino-1-hydroxynaphthalene-2-sulfonic acid (Example 1; 30.0 g.) with 50 ml. acetic anhydride in 25 ml. pyridine, the mixture heated on the steam bath for 1.5 hours. The viscous, cooled solution was extracted twice and a total of 600 ml. benzene and then treated with 500 ml. of saturated aqueous sodium chloride. The resulting tan precipitate was filtered, washed with saturated sodium chloride and dried. The yield of 59 g. contained some sodium chloride.

EXAMPLE 3

Preparation of DRR Compound No. 3

A schematic representation of the reaction involved is shown below:

Preparation of Coupler Intermediate,
5-Methanesulfonamido-2-benzyl-sulfonyl-1-naphthol
(Compound B)

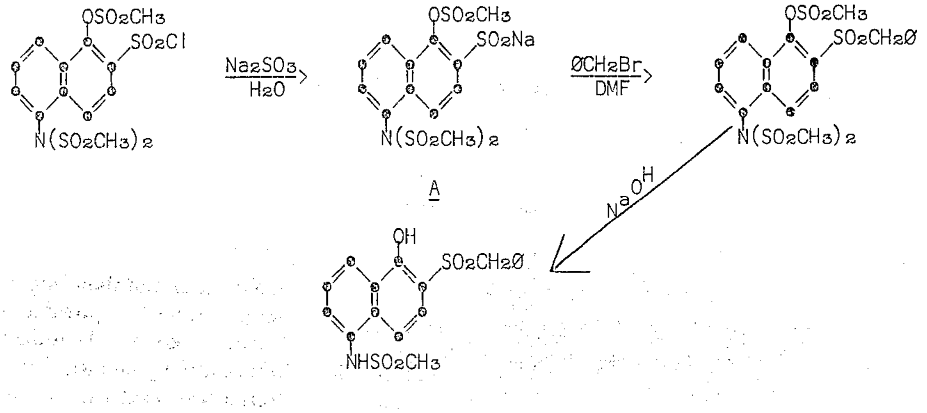

Preparation of Diazonium Intermediate, 4-(4-Chloro-3-aminobenzenesulfonamido)-1-hydroxy-N-[4-(2,4-di-tert-pentylphenoxy)-butyl]-2-naphthamide - (Compound C) and Subsequent Diazotization to Compound D

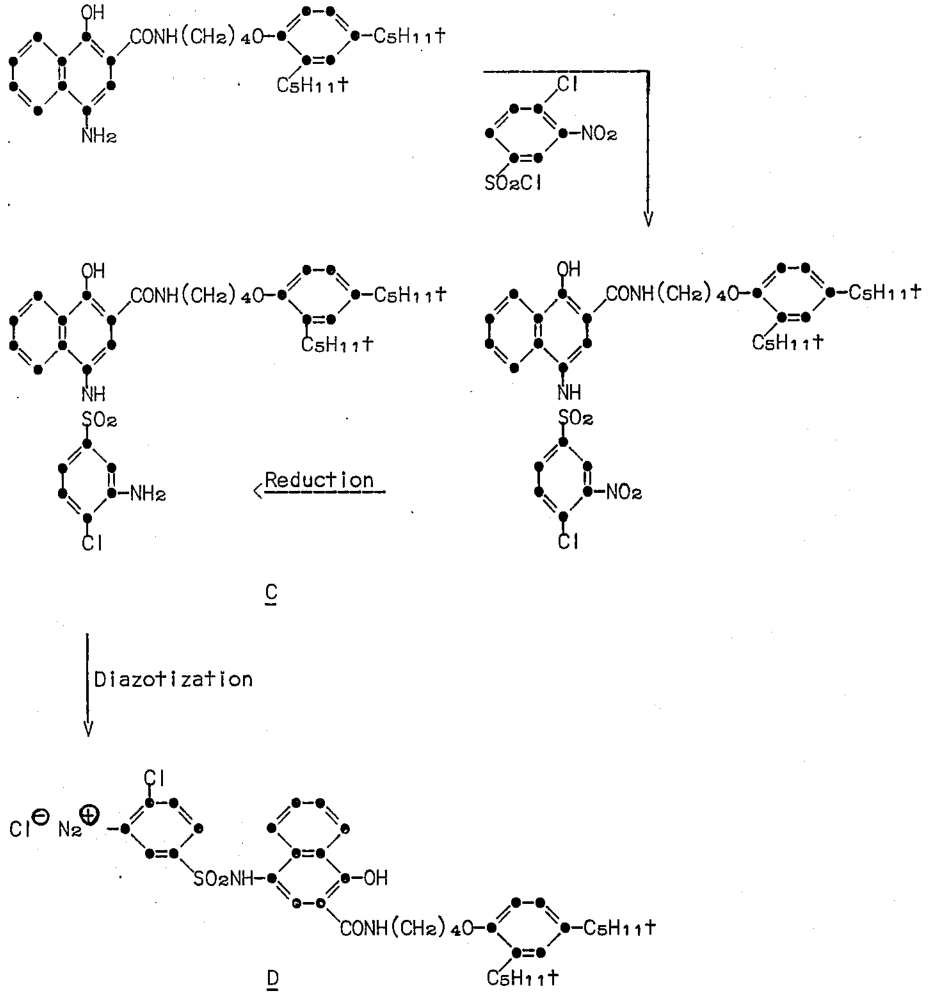

C

D

Preparation of DRR Compound 3

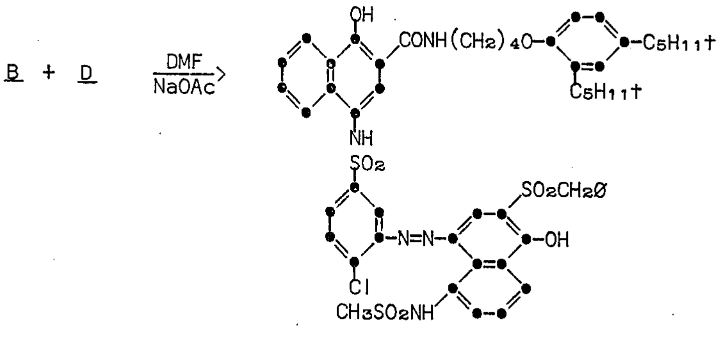

Preparation of Intermediates

Preparation of Compound A

A suspension of 98.4 g. (0.20 mole) 1-methanesulfonyloxy-5-[N,N-di(methanesulfonyl)amino]-2-naphthalenesulfonyl chloride, 126 g. (1.00 mole) sodium sulfide, and 400 ml. water was stirred vigorously and heated to 70°C. The very thick suspension was stirred at 55°–60°C. for 5 hr., then overnight at 25°C. The product was filtered, and the cake washed with 100 ml. cold water and then isopropanol. One hundred and one grams of a white powder was produced which was high assay sodium 1-methanesulfonyloxy-5-[N,N-di(methanesulfonylamino]-2-naphthalenesulfinate. This material was used with no further purification.

Preparation of Compound B
(5-Methanesulfonamido-2-benzylsulfonyl-1-naphthol)

A mixture of 140 g. (0.29 mole) Compound A, 49.5 g. (0.29 mole) benzyl bromide, and 300 ml. dry DMF was stirred and heated on a steam bath for 18 hr. The resulting dark solution was rotary evaporated under reduced pressure to remove most of the solvent and the residue heated with 1 l. of 1N NaOH with stirring on a steam bath for 1 hr. The mixture was poured onto 1 l. iced water containing enough acetic acid to neutralize the excess NaOH, and filtered. The crude coupler was recrystallized twice from boiling acetic acid using Darco treatments and hot filtrations. This gave a 75% yield of pure white coupler as analyzed by IR, NMR, and TLC.

Preparation of Compound C

A solution of 100 g. (0.39 moles) 4-chloro-3-nitrobenzenesulfonyl chloride in 400 ml. p-dioxane was added to a solution of 190 g. (0.39 moles) 1-hydroxy-4-amino-N-[4-(2,4-di-t-pentylphenoxy)-butyl]-2-naphthamide in 600 ml. p-dioxane and 40.7 g. (0.39 moles) 2,6-lutidine previously cooled to 5°C. The reaction was stirred under argon for 3 hrs. at ≤ 10°C., and poured onto 3 l. 10% hydrochloric acid. The gummy solid which separated solidified on stirring and was filtered and air dried to give 280 g. 4-(4-chloro-3-nitrobenzenesulfonamido)-1-hydroxy-N-[4-(2,4-di-tert-pentylphenoxy)-butyl]-2-naphthamide. Recrystallization from 7 l. toluene gave 232 g. pure material, m.p. 221°–223°C.

A solution of 120 g. (0.169 moles) 4-(4-chloro-3-nitrobenzenesulfonamido)-1-hydroxy-N-[4-(2,4-di-tert-pentylphenoxy)-butyl]-2-naphthamide in 1.5 l. methanol was treated with 3.0 g. 5% sulfided platinum on C catalyst and reduced in a rocking autoclave under the following conditions: 500 p.s.i. hydrogen at 85°C. for 1.5 hrs. The reaction mixture was filtered and the filtrate evaporated. The residue was dissolved in 600 ml. boiling acetic acid, treated with decolorizing carbon, filtered hot, and allowed to crystallize. The crystalline product was filtered at 25°C. and recrystallized a second time from acetic acid. This gave 106 g. 4-(4-chloro-3-aminobenzenesulfonamido)-1-hydroxy-N-[4-(2,4-di-tert-pentylphenoxy)-butyl]-2-naphthamide (Compound C), m.p. 180°–182°C.

Preparation of Compound D

Diazotization Step

A solution of 27.2 g. (0.040 mole) 4-(4-chloro-3-amino-benzenesulfonamido)-1-hydroxy-N-[4-(2,4-di-tert-pentylphenoxy)-butyl]-2-naphthamide in 1 l. ethanol was prepared at 50°C. and cooled to 25°C. Anhydrous HCl was added to the stirred solution for 30 minutes at <30°C. The solution was cooled to 0°C. and treated with 4.8 g. (0.041 mole) amyl nitrite. The diazotization was completed after 30 minutes at 0°C.

Coupling Step

A solution of 13.7 g. (0.035 mole) of 5-methanesulfonamido-2-benzylsulfonyl-1-naphthol in 25 ml. DMF was treated with 100 g. anhydrous sodium acetate and the mixture then cooled to 0°C. The suspension of diazonium salt prepared as described above was added in portions with vigorous stirring while maintaining the temperature at 0°C. After the addition was completed, 400 g. sodium acetate was added. The mixture was stirred at ≤ 5°C. for 4 hrs. TLC indicated complete coupling. The reaction was drowned into 4 liters ice water containing 100 ml. acetic acid and stirred to coagulate a red powder which was filtered off. The crude dye cake was analyzed by TLC and found to contain a single magenta DRR component with traces of coupler and other nonpolar impurities which presumably arise from partial decomposition of the diazonium salt during preparation and/or coupling. The impurities were completely removed by crystallization of the crude DRR cake (32 g.) from a solution prepared by boiling the DRR compound with 1.9 l. isopropanol and adding just enough 2-methoxyethanol to give a solution while boiling. This gave 15.5 g. of pure dye. The filtrate gave a second crop (2.6 g.) of pure DRR compound. Total yield: 18.1 g. (48%).

Example 4

Preparation of DRR Compound No. 4

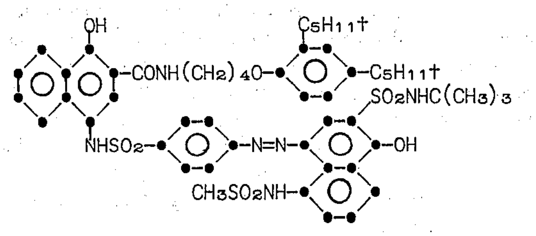

This compound was prepared in a manner similar to that used in Examples 1 and 3 in good yield.

Example 5

Preparation of Shifted Version DRR Compound No. 4

Compound No. 4 is esterified with benzoyl chloride in dry acetone using one equivalent of pyridine as the hydrogen chloride acceptor. This compound is similar to DRR Compound No. 4 except that the hydroxy radical in the para position relative to the point of attachment to the azo linkage of the naphthalene nucleus is replaced with $-OCOC_6H_5$.

Example 6

Table I lists examples of dye-releasing redox (DRR) compounds of the invention including those prepared in Examples 1–4. Data pertaining to these compounds are shown in Table II. Table III lists additional examples of DRR compounds as well as data pertaining to those compounds.

In general the dyes and dye-releasing redox compounds of the invention were prepared by known methods as exemplified above.

The starting compounds are either well known in the art or are prepared by known methods. The diazotization and coupling reactions used in making the DRR compounds were carried out as described in Fierz-David and Blangley, *Processes of Dye Chemistry*, translated from the 5th Austrian Edition by P. W. Vittum, N.Y., Interscience Publishers, Inc., 1949.

Tables II and III shows the absorption, diffusion, and light stability data for the released dyes corresponding to the dye-releasing redox compounds of Tables I and III.

The spectra and light stability tests were measured on a dyed film strip containing a mixture of gelatin and poly(styrene-CO-N-vinylbenzyl-N,N,N-trihexylammonium chloride), which was coated at 2.2 g./m$^2$ of each component on a polyester support with the following exceptions: Compounds 6, 20, 23 and 24 were measured on strips of poly[styrene-CO-N-benzyl-N,N-dimethyl-N-(3-maleimidopropyl)ammonium chloride] which was coated at 2.2 g./m$^2$ in mixture with an equal amount of gelatin on a cellulose acetate support.

The dyes were first dissolved in 0.1 N sodium hydroxide (a few drops of dimethylformamide were needed in some cases). A strip of undyed mordant was immersed in the dye solution until the dye was absorbed by the mordant to a density of approximately 1.5 to 2.0. The strip was then placed in a Harleco standard aqueous buffer solution of the pH indicated in the table, equilibrated for 1 minute, and dried.

A. Spectrophotometry — The spectra of the released dyes, when absorbed to the mordant on a transparent support, were measured spectrophotometrically. The maximum wavelength (λmax) and the bandwidth in nm. at one-half the density at the λmax of the curve for each dye is also given in the table. This "half bandwidth" along with the λmax is indicative of hue, the brightness and purity of color being greater, the smaller the half bandwidth.

B. Light Stability — The light stability was determined by irradiation of a dyed film strip according to one of the following two methods:

1. Exposure to a "simulated average northern skylight" (SANS) test for 7 days: a high intensity 6000 W. Xenon arc lamp (ANSI specification PH 1.42-1969) unit irradiating the sample with 5380 lux at 21°C. and 45% relative humidity.
2. Exposure to a high intensity 6000 W. Xenon arc lamp for 2 days, the sample receiving 50,000 lux through a Wratten 2B (ultraviolet) filter at approximately 38°C. at low humidity.

In both tests the optical density was measured at λmax both before ($D_o$) and after (D) exposure. These values and the percentage loss are given in Tables II and III.

C. Dye-transfer in receiving element — Samples of emulsion coating containing the image dye-providing compounds were fogged by exposure to light and processed by passing them as a "sandwich" with an image receiving element and viscous developing composition (goo) between a pair of juxtaposed pressure-applying rollers. The developer layer thickness of the resulting laminate ranged from about 0.075 to 0.10 mm. The receiving element had the following structure (the coverages in mg./dm$^2$ are shown in parenthesis):

Gelatin (4.3)
Carbon (27) + Gelatin (17)
$TiO_2$ (25) + Gelatin (22)
Mordant* (22) + Gelatin (22)
Cellulose acetate support

*poly(styrene-CO-N-vinylbenzyl-N,N,N-trihexylammonium chloride.

The "goo" contained 20 g. sodium hydroxide, 0.75 g. 4-hydroxy-methyl-4-methyl-1-phenyl-3-pyrazolidone, 10 g. potassium bromide and 25 g. hydroxyethylcellulose, all per liter of solution. Upon application of the goo to the fogged emulsion layer, the dyes are released and diffuse through the carbon and titania layers to the mordant layer. The density of the dyes on the mordant layer was read through the support by means of a reflection densitometer after intervals of 30, 60 and 120 seconds at 24°C. The increase in density, as indicated by the values in the table, is a measure of the rate of release and also of the diffusivity of the dyes. The three figures given in the table are percentages of the densities read at these intervals in relation to the eventual maximum density (Dmax). Most of the dyes measured showed at least 70% diffusion after 60 sec. and 90% after 120 sec.

TABLE I

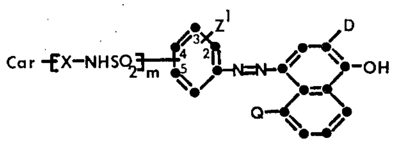

| DRR Compound No. | Car | X | m | D | Q | Z$^1$ |
|---|---|---|---|---|---|---|
| 1 | 4-A* | — | O | $-SO_2NHC(CH_3)_2CH_2C(CH_3)_3$ | $-NHSO_2CH_3$ | H |
| 2 | 4-A | — | O | $-SO_2NH_2$ | $-NHCOCH_3$ | H |
| 3 | 5-A | — | O | $-SO_2CH_2\phi$ | $-NHSO_2CH_3$ | 2-Cl |
| 4 | 4-A | — | O | $-SO_2NH_2$ | $-NHSO_2CH_3$ | H |
| 5 | 4-A | — | O | $-SO_2NHCH_3$ | $-NHSO_2CH_3$ | H |
| 6 | 4-A | — | O | $-SO_2NHC(CH_3)_3$ | $-NHSO_2CH_3$ | H |
| 7 | 4-A | — | O | $-SO_2NH(CH_2)_2CH(CH_3)_2$ | $-NHSO_2CH_3$ | H |
| 8 | 4-A | — | O | $-SO_2NHCH(CH_3)-C(CH_3)_3$ | $-NHSO_2CH_3$ | H |
| 9 | 4-A | — | O | $-SO_2NCH_2CH_2OCH_2CH_2$ | $-NHSO_2CH_3$ | H |
| 10 | 4-A | — | O | $-SO_2NHC(CH_3)_3$ | $-NHSO_2C_3H_7-n$ | H |
| 11 | 4-A | — | O | $-SO_2NHC(CH_3)_3$ | $-NHSO_2C_4H_9-n$ | H |
| 12 | 4-A | — | O | $-SO_2NHC(CH_3)_3$ | $-NHSO_2T$** | H |
| 13 | 4-A | — | O | $-SO_2NHC(CH_3)_2CH_2C(CH_3)_3$ | $-NHSO_2T$** | H |
| 14 | 5-A | — | O | $-SO_2NHCH_3$ | $-NHSO_2CH_3$ | 2-Cl |
| 15 | 5-A | — | O | $-SO_2NHCH_2CF_3$ | $-NHSO_2CH_3$ | 2-Cl |
| 16 | 5-A | — | O | $-SO_2NH(CH_2)_2CH(CH_3)_2$ | $-NHSO_2CH_3$ | 2-Cl |

TABLE I-continued

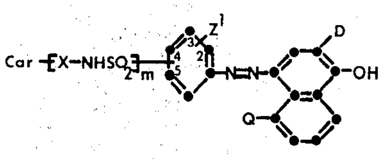

| DRR Compound No. | Car | X | m | D | Q | Z' |
|---|---|---|---|---|---|---|
| 17 | 5-A | — | O | $-SO_2NHC(CH_3)$ | $-NHSO_2CH_3$ | 2-Cl |
| 18 | 5-A | — | O | $-SO_2NHCH_2C(CH_3)_3$ | $-NHSO_2CH_3$ | 2-Cl |
| 19 | 3-A | — | O | $-SO_2NHC(CH_3)_3$ | $-NHSO_2CH_3$ | 4-Cl |
| 20 | 3-A | — | O | $-SO_2NH_2$ | —OH | H |
| 21 | 3-A | $-(CH_2)_3-$ | 1 | $-SO_2NH_2$ | —OH | H |
| 22 | 3-A | — | O | $-SO_2NHCH_3$ | —OH | H |
| 23 | 4-A | — | O | $-SO_2NCH_2CH_2OCH_2CH_2$ | $-NHCOCH_3$ | H |
| 24 | 4-B | — | O | $-SO_2NHC(CH_3)_3$ | $-NHSO_2CH_3$ | H |
| 25 | 4-C | — | O | $-SO_2NCH_2CH_2OCH_2CH_2$ | $-NHSO_2CH_3$ | H |
| 26 | 4-D | — | O | $-SO_2NCH_2CH_2OCH_2CH_2$ | $-NHSO_2CH_3$ | H |
| 27 | 4-D | — | O | $-SO_2NHC(CH_3)_3$ | $-NHSO_2CH_3$ | H |
| 28 | 5-A | — | O | $-SO_2CH_3$ | $-NHSO_2CH_3$ | 2-Cl |
| 29 | 5-A | — | O | $-SO_2(CH_2)_2CH(CH_3)_2$ | $-NHSO_2CH_3$ | 2-Cl |
| 30 | 5-A | — | O | $-SO_2NHCH_2COOH$ | $-NHSO_2CH_3$ | 2-Cl |
| 31 | 3-A | — | O | $-CON(CH_3)_2$ | $-NHSO_2CH_3$ | H |

A = 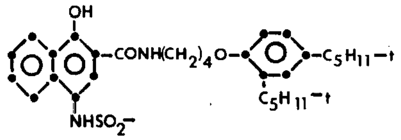

B = 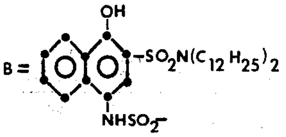

C = 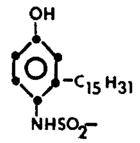

D = 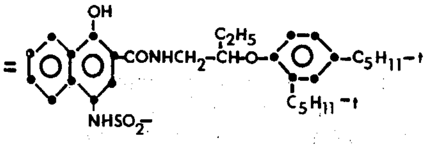

*Position at which Car moiety is bonded relative to azo linkage.
**T = $-m-C_6H_4-SO_2NH_2$

TABLE II

PHOTOGRAPHIC PROPERTIES

| Released Dye of DRR Compound No. | pH | Max (nm) | Half-Band Width (nm) | Density of Dye Transfer Image (% of Final) 30 sec. | 60 sec. | 120 sec. | Light Stability Test No/pH | $D_o$ | D | % Loss |
|---|---|---|---|---|---|---|---|---|---|---|
| 1 | 5 | 549 | 96 | 38 | 63 | 86 | 2/5 | 1.53 | 1.28 | 16 |
| 2 | 7 | 542 | 107 | 41 | 64 | 88 | — | — | — | — |
| 3 | 4 | 548 | 103 | 31 | 57 | 82 | 1/5 | 1.41 | 1.34 | 5 |
| 4 | 4 | 552 | 99 | 43 | 68 | 89 | 2/5 | 1.84 | 1.65 | 10 |
| 5 | 4 | 546 | 98 | 48 | 75 | 94 | 1/4 | 1.17 | 1.07 | 8 |
| 6 | 4 | 545 | 103 | 40 | 62 | 85 | 1/4 | 2.75 | 2.59 | 6 |
| 7 | 4 | 546 | 97 | 43 | 69 | 91 | 2/5 | 1.74 | 1.53 | 12 |
| 8 | — | — | — | 38 | 62 | 84 | 2/5 | 1.74 | 1.57 | 16 |
| 9 | 4 | 551 | 97 | 38 | 63 | 86 | 2/5 | 2.08 | 1.07 | 48 |

TABLE II-continued

PHOTOGRAPHIC PROPERTIES

| Released Dye of DRR Compound No. | pH | Max (nm) | Half-Band Width (nm) | Density of Dye Transfer Image (% of Final) 30 sec. | 60 sec. | 120 sec. | Light Stability Test No/pH | $D_o$ | D | % Loss |
|---|---|---|---|---|---|---|---|---|---|---|
| 10 | 5 | 556 | 92 | 41 | 64 | 85 | 2/5 | 1.16 | 0.91 | 22 |
| 11 | 5 | 551 | 96 | 34 | 58 | 82 | 2/5 | 2.13 | 1.83 | 14 |
| 12 | 5 | 557 | 92 | 42 | 68 | 90 | 2/5 | 1.82 | 0.95 | 48 |
| 13 | 4 | 555 | 97 | 36 | 60 | 84 | 2/5 | 1.82 | 1.64 | 10 |
| 14 | 5 | 549 | 97 | 48 | 75 | 94 | 2/4 | 2.08 | 2.04 | 2 |
| 15 | 5 | 544 | 102 | 43 | 71 | 92 | 2/5 | 1.46 | 1.23 | 16 |
| 16 | 5 | 552 | 99 | 42 | 68 | 89 | 2/5 | 1.53 | 1.39 | 9 |
| 17 | 4 | 554 | 97 | 44 | 70 | 91 | 2/4 | 1.84 | 1.72 | 7 |
| 18 | 4 | 551 | 99 | 42 | 68 | 90 | 2/5 | 1.68 | 1.54 | 8 |
| 19 | 4 | 551 | 94 | 47 | 74 | 94 | 2/5 | 1.59 | 1.42 | 11 |
| 20 | 5 | 546 | 103 | 43 | 67 | 92 | 1/5 | 1.33 | 1.30 | 2 |
| 22 | 4 | 544 | 104 | — | — | — | 2/5 | 1.03 | 0.73 | 29 |
| 23 | 4 | 543 | 106 | 29 | 51 | 75 | 1/5 | 1.40 | 1.18 | 26 |
| 24 | 4 | 545 | 103 | 40 | 62 | 85 | 1/4 | 2.75 | 2.59 | 6 |
| 25 | 4 | 551 | 97 | 38 | 63 | 86 | 2/5 | 2.08 | 1.07 | 48 |
| 26 | 4 | 551 | 97 | 38 | 63 | 86 | 2/5 | 2.08 | 1.07 | 48 |
| 27 | 4 | 552 | 99 | 43 | 68 | 89 | 2/5 | 1.84 | 1.69 | 10 |
| 28 | 4 | 540 | 102 | 51 | 79 | 98 | — | — | — | — |
| 29 | 4 | 546 | — | 40 | 66 | 90 | — | — | — | — |
| 30 | 5 | 552 | 96 | 39 | 63 | 87 | 2/5 | 1.31 | 1.21 | 8 |
| 31 | 6 | 563 | 89 | 49 | 71 | 92 | — | — | — | — |

TABLE III

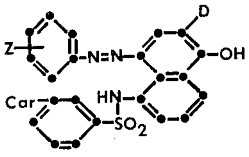

| DRR Compound No. | D | Z | pH | λMax (nm) | Half-band Width (nm) | Density of Dye Transfer Image (% of Final) 30 sec. | 60 sec. | 120 sec. | Light Stability Text No./pH | $D_o$ | D | % Loss |
|---|---|---|---|---|---|---|---|---|---|---|---|---|
| 32 | $-SO_2NHC(CH_3)_3$ | $4-SO_2NH_2$ | 5 | 557 | 92 | 42 | 68 | 90 | 2/5 | 1.82 | 0.95 | 48 |
| 38 | $-SO_2NHC(CH_3)_3$ | $3-SO_2CH_3$ | 4 | 546 | 92 | 46 | 71 | 91 | 2/5 | 1.32 | 1.12 | 15 |
| 34 | $-SO_2NHC(CH_3)_3$ | $3-NO_2$ | 4 | 553 | 97 | 42 | 65 | 86 | 2/5 | 1.48 | 1.12 | 24 |
| 35 | $-SO_2NHCH_3$ | 2,4-di Cl | | | | | | | | | | |

Car = 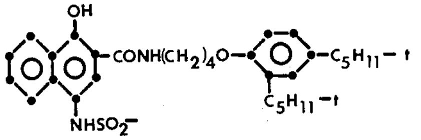

EXAMPLE 7

Dyes such as those released from the previously discussed carriers (Car-) during alkaline processing were prepared and dissolved in 30 ml. of a 0.5N sodium hydroxide solution containing 30 g./l. of hydroxyethylcellulose. Each solution was spread between a cellulose acetate cover sheet and a receiving element so that the alkaline dye composition was 0.1 mm. thick. The receiving element was as described in Example 6. The spectra of the dyes when absorbed to the mordant were determined as in Example 6. The following Tables IV, V and VI show the general formula of the dyes tested and the results obtained.

TABLE IV

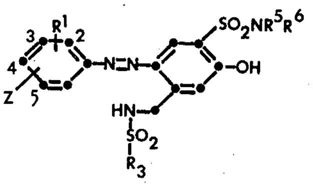

| Dye | $R^1$ | Z | $R^5$ | $R^6$ | $R^3$ | λmax (nm) | Half-Band Width (nm) |
|---|---|---|---|---|---|---|---|
| 1 | H | $4-SO_2NH_2$ | H | $n-C_3H_7$ | $CH_3$ | 545 | 101 |
| 2 | H | $4-SO_2NH_2$ | H | $-(CH_2)_3-SO_2NH_2$ | $CH_3$ | 547 | 95 |

TABLE IV-continued

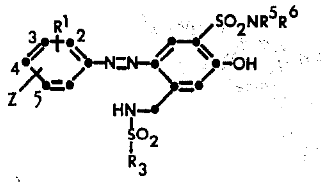

| Dye | R¹ | Z | R⁵ | R⁶ | R³ | λmax (nm) | Half-Band Width (nm) |
|---|---|---|---|---|---|---|---|
| 3 | H | 4-$SO_2NH_2$ | H | —$CH_2CF_3$ | $CH_3$ | 541 | 98 |
| 4 | H | 4-$SO_2NH_2$ | H | —cyclohexyl | $CH_3$ | 549 | 95 |
| 5 | H | 4-$SO_2NH_2$ | H | $C_6H_5$— $C_2H_5$ | $CH_3$ | 546 | 100 |
| 6 | H | 4-$SO_2NH_2$ | H | $CH_2C_4H_9$— | $CH_3$ | 544 | 98 |
| 7 | H | 4-$SO_2NH_2$ | H | 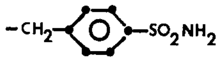 | $CH_3$ | 547 | 96 |
| 8 | H | 4-$SO_2NH_2$ | H |  | $CH_3$ | 546 | 90 |
| 9 | H | 4-$SO_2NH_2$ | =R⁶ | —$CH(CH_3)_2$ | $CH_3$ | 557 | 96 |
| 10 | H | 4-$SO_2NH_2$ | =R⁶ | —$Si(CH_3)_3$ | $CH_3$ | 546 | 100 |
| 11 | H | 4-$SO_2NH_2$ | | —$CH_2CH(CH_3)$—O—$CH(CH_3)$—$CH_2$— | $CH_3$ | 548 | 98 |
| 12 | H | 4-$SO_2N(H)(CH_3)$ | | —$CH_2CH_2$—O—$CH_2CH_2$— | $CH_3$ | 552 | 99 |
| 13 | H | 4-$SO_2N(CH_3)(CH_3)$ | | —$CH_2CH_2$—O—$CH_2CH_2$— | $CH_3$ | 556 | 102 |
| 14 | H | 4-$SO_2NH_2$ | =R⁶ | —$CH_2CH_2OH$ | $CH_3$ | 548 | 100 |
| 15 | H | 4-$SO_2NH_2$ | $CH_3$ | —$C_6H_5$ | $CH_3$ | 550 | 97 |
| 16 | H | 4-$SO_2NH_2$ | | —$CH_2CH_2CH_2CH_2CH_2$— | $CH_3$ | 550 | 105 |
| 17 | H | 4-$SO_2NH_2$ | H | n-$C_5H_{11}$ | $CH_3$ | | |
| 18 | H | 4-$SO_2NH_2$ | =R⁶ | $CH_2CH_2CN$ | $CH_3$ | 543 | 100 |
| 19 | H | 4-$SO_2NH_2$ | | —$CH_2CH_2$—O—$CH_2CH_2$— | $C_6H_5$ | 551 | 98 |
| 20 | H | 4-$SO_2NH_2$ | H | —t$C_4H_9$ | $C_6H_5$ | 553 | 96 |
| 21 | H | 4-$SO_2NH$—$(CH_3)_3CCH_2$ | H | —t$C_4H_9$ | $CH_3$ | 548 | |
| 22 | H | 4-$SO_2NH$—n-$C_3H_7$ | H | —t$C_4H_9$ | $CH_3$ | | |
| 23 | H | 4-$SO_2NH$—A | H | —t$C_4H_9$ | $CH_3$ | 560 | 96 |
| 24 | H | $H_2NSO_2$—$(CH_2)_3$ | | —$CH_2CH_2$—O—$CH_2CH_2$— | $CH_3$ | 543 | 89 |
| 25 | H | 3-$SO_2NH$—$(CH_2)_3$—$SO_2NH_2$ | | —$CH_2CH_2$—O—$CH_2CH_2$— | $CH_3$ | | |
| 26 | H | 4-$SO_2NH_2$ | H | $C(CH_3)_3$ | B | 553 | 95 |
| 27 | H | 4-$SO_2NH_2$ | H | $C(CH_3)_2CH_2C(CH_3)_3$ | B | 555 | 96 |
| 28 | 2-Cl | 5-$SO_2NH_2$ | H | H | $CH_3$ | 550 | 99 |
| 29 | 2-Cl | 5-$SO_2NH_2$ | H | $CH(CH_3)$—$C(CH_3)_3$ | $CH_3$ | 555 | 97 |
| 30 | 2-Cl | 5-$SO_2NH_2$ | H | $C(CH_3)_3$ | n-$C_3H_7$ | 558 | 98 |
| 31 | 4-Cl | 3-$SO_2NH_2$ | H | $CH_3$ | $CH_3$ | 536 | 95 |
| 32 | 4-Cl | 3-$SO_2NH_2$ | H | $C(CH_3)_2CH_2C(CH_3)_3$ | $CH_3$ | 551 | 95 |
| 33 | 4-Cl | 3-$SO_2NH_2$ | H | $C(CH_3)_2CH_2C(CH_3)_3$ | A | | |
| 34 | 4-Cl | 3-$SO_2NH_2$ | H | $C(CH_3)_2CH_2C(CH_3)_3$ | B | | |
| 35 | H | 4-$CONH_2$ | H | $C(CH_3)_3$ | $CH_3$ | 548 | 99 |
| 36 | H | 2-$SO_2NH_2$ | H | $C(CH_3)_3$ | $CH_3$ | 559 | 94 |
| 37 | 2-$OCH_3$ | 5-$SO_2NH_2$ | H | $C(CH_3)_3$ | $CH_3$ | 542 | 100 |
| 38 | H | 2-CN | H | H | $CH_3$ | 554 | 98 |
| 39 | H | 2-$SO_2NH_2$ | H | $CH_3$ | $CH_3$ | | |
| 40 | 2-Cl | 5-$OCH_3$ | H | $C(CH_3)_3$ | B | 550 | 101 |
| 41 | H | 3-$NO_2$ | H | $C(CH_3)_3$ | B | 554 | 96 |
| 42 | H | 3-$SO_2CH_3$ | H | $C(CH_3)_3$ | B | 547 | 90 |
| 43 | 2-Cl | 5-Cl | H | $C(CH_3)_3$ | A | 559 | 99 |
| 44 | 2-Cl | 5-Cl | H | $C(CH_3)_3$ | B | 558 | 101 |
| 45 | 2-Cl | 5-Cl | H | $CH_3$ | B | 555 | 101 |
| 46 | 2-Cl | 4-Cl | H | $C(CH_3)_3$ | B | 557 | 97 |
| 47 | 2-Cl | 4-Cl | H | $C(CH_3)_3$ | A | 555 | 102 |
| 48 | 2-Cl | 4-Cl | H | $CH_3$ | A | 553 | 100 |
| 49 | 2-Cl | 4-Cl | H | $CH_3$ | B | 552 | 100 |

TABLE IV-continued

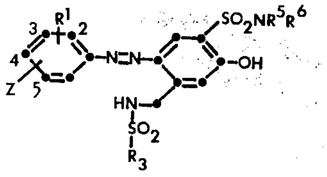

| Dye | $R^1$ | Z | $R^5$ | $R^6$ | $R^3$ | λmax (nm) | Half-Band Width (nm) |
|---|---|---|---|---|---|---|---|
| 50 | H | 3-$SO_2CH_3$ | H | t-$C_8H_{17}$ | B | — | — |

A = 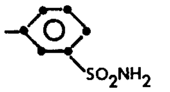

B = 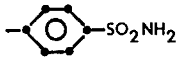

TABLE V

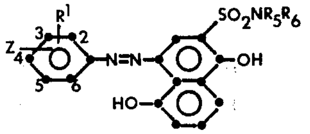

| Dye | $R^1$ | Z | $R^5$ | $R^6$ | λmax (nm) | Half-Band Width (nm) |
|---|---|---|---|---|---|---|
| 51 | H | 3-$SO_2NH_2$ | H | $COCH_3$ | 546 | 104 |
| 52 | H | 4-$SO_2NH_2$ | H | $COCH_3$ | 551 | 111 |
| 53 | 4-Cl | 3-$SO_2NH_2$ | H | H | 547 | 109 |
| 54 | 3-Cl | 3-$SO_2NH_2$ | H | H | 544 | 98 |
| 55 | H | 3-$SO_2NH_2$ | H | $(CH_2)_3SO_2NH_2$ | 552 | — |
| 56 | H | 3-$SO_2NH(CH_2)_3SO_2NH_2$ | H | H | 545 | — |

TABLE VI

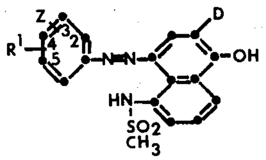

| Dye No. | $R^1$ | Z | D | pH | λMax (nm) | Half-Band Width (nm) |
|---|---|---|---|---|---|---|
| 57 | H | 3-$SO_2NH_2$ | $-SO_2NHCOCH_3$ | 5 | 528 | 103 |
| 58 | H | 4-$SO_2NH_2$ | $-SO_2NHCOCH_3$ | 4 | 541 | 109 |
| 59 | H | 3-$SO_2NH_2$ | $-SO_2NH_2$ | 7 | 534 | 100 |
| 60 | 2-$OCH_3$ | 5-$SO_2NH_2$ | $-SO_2NH_2$ | 7 | 537 | 109 |
| 61 | H | 4-$SO_2NHCH_3$ | $-SO_2NH_2$ | — | 538 | — |
| 62 | H | 3-$SO_2CH_3$ | $-SO_2NH_2$ | 7 | 541 | 106 |
| 63 | 3-$SO_2NH_2$ | 5-$SO_2NH_2$ | $-SO_2NH_2$ | 7 | 545 | 106 |
| 64 | H | 4-G* | $-SO_2NH_2$ | 7 | 529 | — |
| 65 | 2-Cl | 4-$SO_2NH_2$ | $-SO_2CH_3$ | 4 | 546 | 113 |
| 66 | 2-Cl | 4-$SO_2NH_2$ | $-SO_2CH_2\phi$ | 4 | 561 | 110 |
| 67 | H | 4-$SO_2$ $NH_2$ | $-SO_2CH_3$ | 4 | 530 | 114 |
| 68 | 2-Cl | 5-$SO_2NH_2$ | $-SO_2CH_2-p-C_6H_4COOH$ | 4 | 545 | — |
| 69 | 2-Cl | 5-$SO_2NH_2$ | $-SO_2CH_2CH_2SO_3H$ | 4 | 540 | — |
| 70 | 2-Cl | 5-$SO_2NH_2$ | $-SO_2CH_2CH_2COOH$ | 4 | 542 | — |
| 71 | H | 4-$SO_2NH_2$ | $-CON(CH_3)_2$ | 7 | 573 | 96 |
| 72 | H | 4-$SO_2NH_2$ | $-SO_2NHCH_2COOH$ | 5 | 547 | 96 |
| 73 | H | 3-$SO_2NH_2$ | $-SOC_6H_5$ | 5 | 554 | 91 |
| 74 | 2-Cl | 5-$SO_2NH_2$ | $-SO_3H$ | 7 | 566 | — |
| 75 | H | 4-$SO_2NH_2$ | $-SOC_6H_5$ | 5 | 567 | 99 |
| 76 | 2-Cl | 5-$SO_2NH_2$ | $-SO_3C_6H_5$ | 5 | 544 | 100 |

TABLE VI-continued

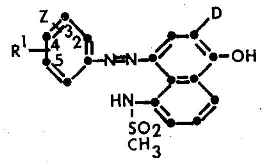

| Dye No. | $R^1$ | Z | D | pH | λMax (nm) | Half-Band Width (nm) |
|---|---|---|---|---|---|---|
| 77 | H | 4-$SO_2NH_2$ | $-SO_3C_6H_5$ | 5 | 537 | 99 |

*G = $-SO_2(CH_2)_2CONH-m-C_6H_4SO_2NH_2$

EXAMPLE 8

An integral multicolor photosensitive element is prepared by coating the following layers in the order recited on a transparent poly(ethylene terephthalate) film support (coverages in g./$m^2$ unless specified otherwise):

1. image-receiving layer of copoly[styrene-CO-N-vinyl-benzyl-N,N,N-trihexylammonium chloride] (2.2) and gelatin (2.2);
2. reflecting layer of titanium dioxide (22) and gelatin (2.2);
3. opaque layer of carbon black (2.7) and gelatin (1.7);
4. cyan image dye-providing compound (0.54) having the formula

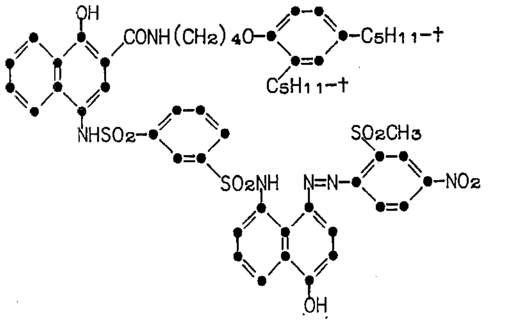

and gelatin (0.73);

5. red-sensitive, internal-image gelatin-silver chlorobromide emulsion (1.1 g. gelatin/$m^2$ and 1.1 g. silver/$m^2$), 2-sec-octadecylhydroquinone-5-sulfonic acid (8 g./mole silver and nucleating agent 1-acetyl-2-[p-[5-amino-2-(2,4-di-t-pentylphenoxy)benzamido]phenyl]hydrazine (1.5 g./mole of silver);
6. interlayer of gelatin (0.55) and 2,5-di-sec-dodecylhydroquinone (1.1);
7. magenta DRR Compound (0.65) No. 9 of Table I and gelatin (1.1);
8. green-sensitive, internal-image gelatin-silver chlorobromide emulsion (1.2 g. gelatin/$m^2$ and 1.1 g. silver/$m^2$), 2-sec-octadecylhydroquinone-5-sulfonic acid (16 g./mole silver) and nucleating agent 1-acetyl-2-[p-[5-amino-2-(2,4-di-t-pentylphenoxy)benzamido]phenyl]hydrazine (1.5 g. mole silver);
9. interlayer of gelatin (0.55) and 2,5-di-sec-dodecylhydroquinone (1.1);
10. yellow image dye-providing compound (1.1) having the formula

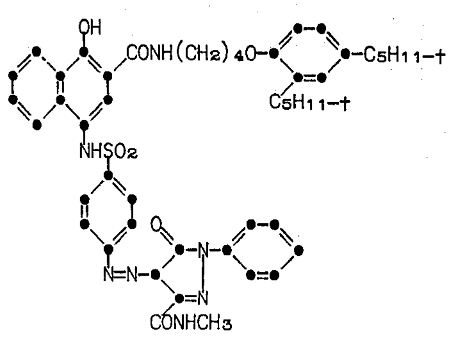

and gelatin (1.1);

11. blue-sensitive internal-image gelatin-silver chlorobromide emulsion (1.1 g. gelatin/$m^2$ and 1.1 g. silver/$m^2$), 2-sec-octadecylhydroquinone-5-sulfonic acid (8 g./mole silver) and nucleating agent 1-acetyl-2-[p-[5-amino-2-(2,4-di-t-pentylphenoxy)benzamido]phenyl]hydrazine (1.5 g./mole silver); and
12. overcoat of gelatin (0.54).

The above silver halide emulsions are direct-positive emulsions having high internal sensitivity and low surface sensitivity of the type described in U.S. Pat. No. 3,761,276.

The above-prepared photosensitive element is then exposed to a graduated-density multicolor test object. The following processing composition is employed in a pod and is spread between the photosensitive element and an opaque cellulose acetate sheet by passing the transfer "sandwich" between a pair of juxtaposed pressure rollers:

| | | |
|---|---|---|
| potassium hydroxide | 56 | g. |
| 4-hydroxymethyl-4-methyl-1-phenyl-3-pyrazolidone | 8 | g. |
| 5-methylbenzotriazole | 2.4 | g. |
| t-butylhydroquinone | 0.2 | g. |
| sodium sulfite (anhydrous) | 2.0 | g. |
| carbon | 40 | g. |
| hydroxyethyl cellulose | 25 | g. |
| distilled water to | 1000 | ml. |

The cover sheet is prepared by coating the following layers on a poly(ethylene terephthalate) film support:

1. a timing layer of cellulose acetate (3.3)
2. an acid layer of polyacrylic acid (23)

After 3 hours the following sensitometric results are read from the image-receiving side of the laminate:

| Maximum Density Red | Green | Blue | Minimum Density Red | Green | Blue |
|---|---|---|---|---|---|
| 2.18 | 2.18 | 1.54 | 0.28 | 0.27 | 0.24 |

The yellow image dye-providing compound used in this example is prepared as follows:

To a solution of 7.3 g. (0.015 mole) of 1-hydroxy-4-amino-N-[4-(2,4-di-t-amylphenoxy)butyl]-2-naphthamide in 60 ml. of dry pyridine cooled to 2°C. in an ice bath and stirred in a nitrogen atmosphere are added 6.4 g. (0.016 mole) of 1-phenyl-3-methylcarbamyl-4-(p-chlorosulfonylphenylazo)-5-pyrazolone. The mixture is stirred for 2 hours at room temperature and poured into 1 liter of ice and water containing 75 ml. of hydrochloric acid. The precipitate is collected, dried and recrystallized to give 10.4 g. of the yellow image dye-providing compound.

The invention has been described in detail with particular reference to certain preferred embodiments thereof, but it will be understood that variations and modifications can be effected within the spirit and scope of the invention.

We claim:

1. A magenta image dye-providing compound having a formula as follows:

I.

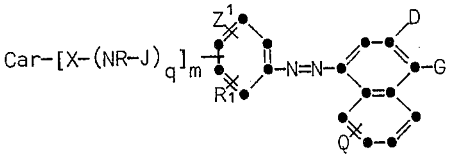

II.

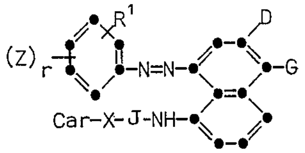

III.

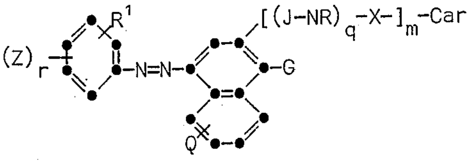

wherein:

Car represents a carrier moiety which, as a function of oxidation under alkaline conditions, releases a diffusable dye from said compound and having the formula

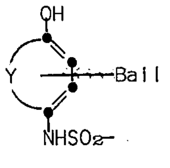

wherein

Ball represents an organic ballasting group containing at least 8 carbon atoms which renders said compound nondiffusible in a photographic element during development in an alkaline processing composition;

Y represents the carbon atoms necessary to complete a benzene or naphthalene nucleus;

*m* and *q* each represent an integer having a value of 0 or 1;

X represents a bivalent linking group of the formula $-R^2-L_n-R_p^2-$ where each $R^2$ can be the same or different and each represents alkylene having 1 to 8 carbon atoms; phenylene; or phenylene substituted with chloro, bromo, cyano, nitro, methoxy, methyl, carboxy or sulfo; L represents oxy, carbonyl, carboxamido, carbomoyl, sulfonamido, sulfamoyl sulfinyl or sulfonyl; *n* is an integer having a value of 0 to 1; *p* is 1 when *n* equals 1 and *p* is 1 or 0 when *n* equals *o* or when *q* is *o;* Car-X- represents Car-alkylene-$SO_2$-, Car-$C_6H_4CH_2SO_2$-, or Carphenylene-$SO_2$-, provided that the carbon content of X does not exceed 14 carbon atoms;

R represents hydrogen or alkyl having 1 to 6 carbon atoms;

J represents sulfonyl or carbonyl;

Q is in the 5- or 8-position relative to G and represents hydroxy, $-NHCOR^3$ or $-NHSO_2R^3$ wherein $R^3$ is alkyl having 1 to 6 carbon atoms, alkyl having 1 to 6 carbon atoms substituted with hydroxy, cyano, sulfamoyl, carboxyl or sulfo; benzyl, phenyl, or phenyl substituted with carboxy, cyano, chloro, methoxy, methyl or sulfamoyl;

G represents hydroxy, an alkali metal salt thereof, a photographically inactive amine salt thereof, or a hydrolyzable acyloxy group having the formula:

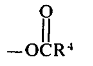 or 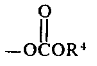

wherein $R^4$ is alkyl having 1 to 18 carbon atoms, phenyl or phenyl substituted with chloro or nitro;

*r* represents an integer having a value of 1 or 2;

Z represents cyano, trifluoromethyl, fluorosulfonyl, carboxy, $-COOR^4$ wherein $R^4$ is as described previously, nitro in the 2- or 3-position relative to the azo linkage, fluoro, chloro or bromo, alkylsulfonyl having 1 to 7 carbon atoms, alkylsulfonyl having 1 to 8 carbon atoms substituted with hydroxy, phenyl, cyano, sulfamoyl, carboxy or sulfo; phenylsulfonyl, phenylsulfonyl substituted with sulfamoyl, carboxy, fluorosulfonyl or methoxy; alkylcarbonyl having 2 to 5 carbon atoms, $-SO_2NR^5R^6$ wherein $R^5$ represents hydrogen, alkyl having 1 to 8 carbon atoms; $R^6$ represents hydrogen, alkyl having 1 to 6 carbon atoms, alkyl having 1 to 6 carbon atoms substituted with hydroxy, cyano, fluorosulfonyl, carboxy or sulfo; benzyl, phenyl, phenyl substituted with hydroxy, sulfonyl, sulfamoyl, carboxy or sulfo; alkylcarbonyl having 2 to 7 carbon atoms, phenylcarbonyl, alkylsulfonyl having 1 to 6 carbon atoms, alkylsulfonyl having 1 to 6 carbon atoms substituted with cyano or hydroxy; phenylsulfonyl or methoxyphenylsulfonyl; or Z represents $-CON(R^5)_2$ wherein each $R^5$ can be the same or different and is as described previously;

$Z^1$ represents hydrogen or Z;

$R^1$ represents hydrogen, alkyl having 1 to 4 carbon atoms, alkyl having 1 to 4 carbon atoms substituted with cyano, hydroxy or methoxy; alkoxy having 1 to 4 carbon atoms, chloro, bromo or fluoro;

D represents cyano, sulfo, fluorosulfonyl, chloro, bromo, fluoro, $-SO_3$-phenyl or $-SO_3$-phenyl substituted with hydroxy, chloro, carboxy, sulfamoyl, methyl or methoxy; alkylsulfonyl having 1 to 8 carbon atoms, alkylsulfonyl having 1 to 8 carbon atoms substituted with chloro, fluoro, hydroxy, phenyl, cyano, phenylsulfonyl or phenylsulfonyl substituted with carboxy, fluorosulfonyl or methoxy; alkylsulfinyl having 1 to 8 carbon atoms or alkylsulfinyl having 1 to 8 carbon atoms substituted with cyano, phenyl, hydroxy or sulfamoyl; phenylsulfinyl or phenylsulfinyl substituted with sulfo or fluorosulfonyl, $-SO_2NR^5R^6$, or $-CON(R^5)_2$ wherein each $R^5$ and $R^6$ is as described previously for Z, with the proviso that there be no more than one sulfo radical and no more than one carboxy radical present in said compound.

2. A compound as described in claim 1 wherein

Y represents the atoms necessary to complete a naphthalene nucleus;

$R^2$ represents alkylene having 1 to 4 carbon atoms, phenylene or phenylene substituted with carboxy, chloro, methyl or methoxy;

*n* is an integer having a value of 0;

R represents hydrogen;

J represents sulfonyl;

*m* is an integer having a value of 0 or 1;

Q is in the 5-position relative to G and represents hydroxy, $NHCOR^3$ or $-NHSO_2R^3$ wherein $R^3$ represents alkyl having 1 to 4 carbon atoms; alkyl having 1 to 4 carbon atoms substituted with hydroxy, cyano, sulfamoyl, carboxy or sulfo; benzyl, phenyl or phenyl substituted with carboxy, chloro, methyl, methoxy or sulfamoyl;

G represents hydroxy or a hydrolyzable acyloxy group having the formula:

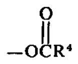 or 

wherein $R^4$ is alkyl having 1 to 18 carbon atoms or phenyl;

*r* is an integer having a value of 1;

Z represents cyano, trifluoromethyl, fluorosulfonyl, chloro, fluoro, bromo, nitro in the 2- or 3- position relative to the azo linkage, alkylsulfonyl having 1 to 7 carbon atoms, alkylsulfonyl having 1 to 6 carbon atoms substituted with hydroxy, phenyl, cyano, sulfamoyl, carboxy or sulfo; $-SO_2NHR^6$ wherein $R^6$ is hydrogen, alkyl having 1 to 4 carbon atoms, or alkyl having 1 to 4 carbon atoms substituted with hydroxy, cyano, sulfamoyl, carboxy or sulfo; benzyl, phenyl or phenyl substituted with hydroxy, sulfonyl, sulfamoyl, carboxy or sulfo;

$Z^1$ represents hydrogen;

$R^1$ represents hydrogen, methoxy, chloro or fluoro;

D represents chloro, bromo, alkylsulfonyl having 1 to 6 carbon atoms, alkylsulfonyl having 1 to 6 carbon atoms substituted with chloro, fluoro, hydroxy, phenyl, cyano, sulfamoyl, carboxy, sulfo, sulfamoylphenyl, carboxyphenyl, chlorophenyl, cyanophenyl, methylphenyl, nitrophenyl; phenylsulfonyl; $-SO_2NR^5R^6$ wherein $R^5$ is hydrogen or methyl, $R^6$ is hydrogen; alkyl of 1 to 8 carbon atoms; alkyl having 1 to 6 carbon atoms substituted with hydroxy, cyano, sulfamoyl, carboxy, or sulfo; benzyl, phenyl or phenyl substituted with hydroxy, sulfamoyl, carboxy or sulfo.

3. A compound having the formula

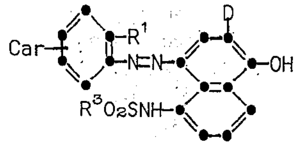

wherein

Car represents a carrier moiety which as a function of oxidation under alkaline conditions releases a diffusible magenta dye from said compound; and having the formula

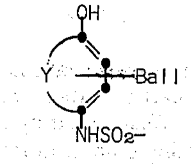

wherein

Ball represents an organic ballasting group containing at least 8 carbon atoms which renders said compound nondiffusible in a photographic element during development in an alkaline processing composition;

Y represents the carbon atoms necessary to complete a benzene or naphthalene nucleus;

$R^1$ represents hydrogen or chloro;

$R^3$ represents alkyl having 1 to 4 carbon atoms;

D represents alkylsulfonyl having 1 to 5 carbon atoms, benzylsulfonyl, $-SO_2NHR^6$ wherein $R^6$ is alkyl having 1 to 8 carbon atoms.

4. A compound as described in claim 3 wherein Car is in the 4-position relative to the azo linkage when $R^1$ is hydrogen and Car is in the 5-position when $R^1$ is chloro; $R^3$ represents methyl; and D represents $-SO_2CH_2C_6H_5$, $-SO_2NHC_4H_9$-t or $-SO_2NHCH_3$.

5. A compound as described in claim 4 wherein $R^1$ is hydrogen and D represents $-SO_2NHC_4H_9$-t.

6. A compound as described in claim 4 wherein -Ball is linked to the sulfonamidonaphthol nucleus through a bivalent

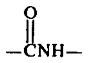 or $-SO_2NH-$ moiety.

7. A compound as described in claim 5 wherein -Ball represents

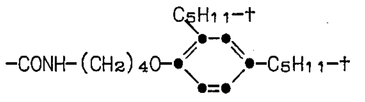

and is in the 2-position relative to the hydroxy group.

8. A compound having the formula

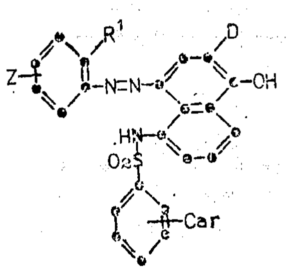

wherein

Car represents a carrier moiety which as a function of oxidation under alkaline conditions releases a diffusible magenta dye from said compound and having the formula

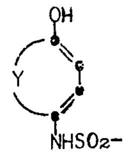

wherein

Ball represents an organic ballasting group containing at least 8 carbon atoms which renders said compound nondiffusible during development in an alkaline processing composition;

Y represents the carbon atoms necessary to complete a benzene or naphthalene nucleus;

D represents -$SO_2NHCH_3$ or -$SO_2NHC_4H_9t$;

$R^1$ represents hydrogen or chloro;

Z represents 5-sulfamoyl when $R^1$ is 2-chloro; and when $R^1$ is hydrogen Z represents 4-sulfamoyl, 3-methylsulfonyl or 3-nitro.

9. A compound as described in claim 8 wherein -Ball is linked to the benzene or naphthalene nucleus through a

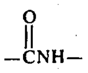 or —$SO_2NH$— moiety.

10. A compound as described in claim 8 wherein -Ball represents

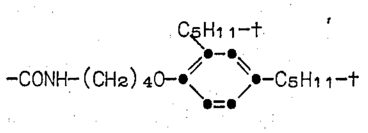

and is in the 2-position relative to the hydroxy group.

11. A compound as described in claim 5 wherein -Ball represents

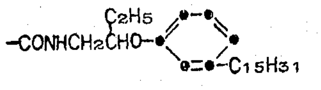

and is in the 2-position relative to the hydroxy group.

12. A compound as described in claim 8 wherein Y represents the carbon atoms necessary to complete a naphthalene nucleus; and -Ball represents

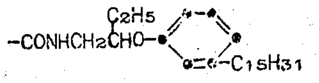

and is in the 2-position relative to the hydroxy group.

* * * * *